United States Patent
Matsubaguchi et al.

(10) Patent No.: US 6,579,592 B1
(45) Date of Patent: Jun. 17, 2003

(54) MAGNETIC RECORDING TAPE WITH CONTROLLED HC AND MAGNETIC FLUX/ UNIT AREA VALUE AND CONTROLLED CL/ FE INTENSITY

(75) Inventors: Satoshi Matsubaguchi, Kanagawa (JP); Masaki Suzuki, Kanagawa (JP); Hiroaki Doushita, Kanagawa (JP); Hiroaki Takano, Kanagawa (JP); Hiroo Inaba, Kanagawa (JP); Kiyomi Ejiri, Kanagawa (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 0 days.

(21) Appl. No.: 09/324,754

(22) Filed: Jun. 3, 1999

Related U.S. Application Data

(63) Continuation-in-part of application No. 08/976,822, filed on Nov. 24, 1997, now abandoned.

(30) Foreign Application Priority Data

| Nov. 29, 1996 | (JP) | ............................................. 8-320134 |
| Nov. 29, 1996 | (JP) | ............................................. 8-320135 |
| Nov. 29, 1996 | (JP) | ............................................. 8-320138 |

(51) Int. Cl.$^7$ ............................................. G11B 5/702
(52) U.S. Cl. ........................ 428/141; 428/323; 428/332; 428/402; 428/425.9; 428/522; 428/694 BC; 428/694 BU; 428/694 BY; 428/694 BS; 428/694 BA
(58) Field of Search .............................. 428/332, 402, 428/696, 694 BY, 694 BS, 694 BB, 694 BR, 900, 323, 141, 425.9, 522, 694 BC, 694 BA

(56) References Cited

U.S. PATENT DOCUMENTS

| 4,163,823 A | 8/1979 | Legras et al. ............ 428/317.9 |
| 4,439,795 A | 3/1984 | Kitamoto et al. ............ 360/131 |
| 4,447,270 A | 5/1984 | Howard et al. ............. 106/438 |
| 4,452,830 A | 6/1984 | Yoshizumi .................. 427/15 |
| 4,506,000 A | 3/1985 | Kubota et al. ................ 430/39 |
| 4,507,157 A | 3/1985 | Oliver, Jr. ................... 117/256 |
| 4,528,240 A | 7/1985 | Miyoshi et al. ............. 428/323 |
| 4,587,157 A | 5/1986 | Brock et al. ................ 428/216 |
| 4,617,226 A | 10/1986 | Yamaguchi et al. ........ 428/216 |
| 4,619,856 A | 10/1986 | Kamada et al. ............. 428/143 |
| 4,649,073 A | 3/1987 | Suzuki et al. ............... 428/212 |
| 4,654,260 A | 3/1987 | Chubachi et al. ........... 428/328 |
| 4,664,975 A | 5/1987 | Kobayashi et al. ......... 428/323 |
| 4,666,769 A | 5/1987 | Miyata et al. .............. 428/323 |
| 4,708,906 A | 11/1987 | Sekiy et al. ................ 428/336 |
| 4,741,953 A | 5/1988 | Katsuta et al. .............. 428/323 |
| 4,746,558 A | 5/1988 | Shimozawa et al. ........ 428/141 |
| 4,756,953 A | 7/1988 | Utsumi ........................ 428/220 |
| 4,784,895 A | 11/1988 | Mizuno et al. ............... 512/25 |
| 4,794,042 A | 12/1988 | Kubota et al. .............. 428/328 |
| 4,839,225 A | 6/1989 | Matsufuji et al. ............ 428/336 |
| 4,844,963 A | 7/1989 | Takasuna et al. ........... 428/65.3 |
| 4,847,147 A | 7/1989 | Aonuma et al. ............. 428/329 |
| 4,851,289 A | 7/1989 | Ogawa et al. .............. 428/329 |
| 4,857,388 A | 8/1989 | Ogawa et al. .............. 428/212 |
| 4,863,791 A | 9/1989 | Steward et al. ........... 428/310.5 |

(List continued on next page.)

FOREIGN PATENT DOCUMENTS

| EP | 0 392 810 A2 | 10/1990 |
| GB | 1417442 | 12/1975 |
| GB | 1417765 | 12/1975 |
| JP | A-62-92128 | 4/1962 |
| JP | A-63-113931 | 5/1963 |
| JP | A-54-30002 | 3/1979 |
| JP | 55-55438 | 4/1980 |
| JP | A-55-139634 | 10/1980 |
| JP | B-57-6178 | 2/1982 |
| JP | 58-85931 | 5/1983 |
| JP | A-58-139337 | 8/1983 |
| JP | A-58-159228 | 9/1983 |
| JP | 58-51327 | 11/1983 |
| JP | 59-8124 | 1/1984 |
| JP | 59-154646 | 9/1984 |
| JP | 60-109020 | 6/1985 |
| JP | A-6-164926 | 8/1985 |
| JP | 60-154327 | 8/1985 |
| JP | 60-193130 | 10/1985 |
| JP | A-61-172215 | 8/1986 |
| JP | 61-204827 | 9/1986 |
| JP | 61 204 827 | 9/1986 |
| JP | 61-204829 | 9/1986 |
| JP | 61-214127 | 9/1986 |
| JP | A-61-216116 | 9/1986 |
| JP | 61-237623 | 10/1986 |
| JP | A-61-241325 | 10/1986 |
| JP | A-62-22235 | 1/1987 |

(List continued on next page.)

OTHER PUBLICATIONS

JPO Abstract Translation of JP–04–119521–A (Image ID = JP404119521A).*

The Advantages of the Thin Magnetic Layer on a Metal Particulate Tape, IEEE Transactions on Magnetics, vol. 29, No. 6, Nov. 1993.

Development of Particulate Recording Media with Ultrathin Magnetic Layer, IEICE Trans Electron, vol. E78–C. No. 11, Nov. 1995.

Enabling technologies for a 100MB 3.5 floppy (ZIP™) disk drive, 220/SPIE vol. 2604.

*Primary Examiner*—Paul Thibodeau
*Assistant Examiner*—Kevin M. Bernatz
(74) *Attorney, Agent, or Firm*—Stroock & Stroock & Lavan LLP

(57) ABSTRACT

A magnetic recording tape is described, which comprises a plastic support having provided thereon a magnetic layer comprising a ferromagnetic metal powder dispersed in a binder, wherein the magnetic layer has the product P of the coercivity Hc (Oe) in the in-plane machine direction of the tape and the magnetic flux $\phi m$ (G·cm) of from 100 to 160.

30 Claims, No Drawings

U.S. PATENT DOCUMENTS

| | | | |
|---|---|---|---|
| 4,863,793 A | 9/1989 | Ogawa et al. ............... 428/323 |
| 4,865,924 A | 9/1989 | Saito et al. |
| 4,874,633 A | 10/1989 | Komatsu et al. .......... 427/54 G |
| 4,910,068 A | 3/1990 | Tokagi et al. ............... 428/141 |
| 4,916,024 A | 4/1990 | Kasuga et al. .............. 428/323 |
| 4,943,479 A | 7/1990 | Yamada et al. ............. 428/331 |
| 4,952,444 A | 8/1990 | Kawamata et al. ......... 428/141 |
| 4,963,433 A | 10/1990 | Ogawa et al. ............... 428/323 |
| 4,965,120 A | 10/1990 | Ono et al. ................... 428/213 |
| 5,030,484 A | 7/1991 | Chino et al. ............. 427/434.3 |
| 5,032,428 A | 7/1991 | Ogawa et al. ............... 427/130 |
| 5,051,291 A | 9/1991 | Kowahaue et al. ......... 428/141 |
| 5,051,303 A | 9/1991 | Naguchi et al. ............ 428/329 |
| 5,093,191 A * | 3/1992 | Sano et al. .................. 428/323 |
| 5,093,192 A | 3/1992 | Kawahara et al. .......... 428/323 |
| 5,104,750 A | 4/1992 | Kubo et al. .......... 428/694 MT |
| 5,112,679 A | 5/1992 | Nakagawa et al. ......... 428/323 |
| 5,151,323 A | 9/1992 | Kowahaue et al. ......... 428/323 |
| 5,156,908 A | 10/1992 | Araki et al. ................. 428/323 |
| 5,160,761 A | 11/1992 | Koga et al. ................. 427/548 |
| 5,196,265 A | 3/1993 | Ryoke et al. ............... 428/332 |
| 5,219,670 A | 6/1993 | Ohno et al. ............. 428/694 B |
| 5,258,223 A | 11/1993 | Inaba et al. ................. 428/323 |
| 5,266,376 A | 11/1993 | Okazaki et al. ............. 428/141 |
| 5,268,206 A | 12/1993 | Komatsu et al. ............ 427/548 |
| 5,300,314 A | 4/1994 | Hayakawa et al. ........... 427/58 |
| 5,318,838 A | 6/1994 | Matsufuji et al. ........... 428/328 |
| 5,358,777 A | 10/1994 | Kojima et al. .............. 428/212 |
| 5,384,175 A | 1/1995 | Kojima et al. .............. 428/65.3 |
| 5,455,104 A | 10/1995 | Sekiguchi et al. .......... 428/212 |
| 5,455,112 A | 10/1995 | Inaba et al. ................. 428/323 |
| 5,458,948 A | 10/1995 | Yanagita et al. ............ 428/141 |
| 5,489,466 A | 2/1996 | Inaba et al. ................. 428/212 |
| 5,503,911 A | 4/1996 | Aoki et al. .................. 428/213 |
| 5,514,464 A | 5/1996 | Sasaki et al. ............... 428/323 |
| 5,518,804 A | 5/1996 | Mizuno et al. .............. 428/212 |
| 5,532,041 A | 7/1996 | Honjo et al. ................ 428/141 |
| 5,547,772 A | 8/1996 | Saito et al. ............. 428/694 B |
| 5,597,638 A | 1/1997 | Saito et al. ................. 428/141 |
| 5,645,917 A | 7/1997 | Ejiri et al. |
| 5,672,423 A | 9/1997 | Inaba et al. ................. 428/323 |
| 5,698,311 A * | 12/1997 | Masaki et al. .............. 428/328 |
| 5,756,148 A | 5/1998 | Ejiri et al. |
| 5,763,046 A | 6/1998 | Ejiri et al. |
| 5,780,141 A | 7/1998 | Ejiri et al. |
| 5,792,543 A | 8/1998 | Ejiri et al. |
| 5,795,645 A * | 8/1998 | Takahashi et al. .......... 428/216 |
| 5,795,646 A | 8/1998 | Ejiri et al. |
| 5,811,166 A | 9/1998 | Ejiri et al. |
| 5,811,172 A | 9/1998 | Ejiri et al. |
| 5,827,600 A | 10/1998 | Ejiri et al. |
| 5,851,622 A | 12/1998 | Ejiri et al. |
| 5,876,833 A * | 3/1999 | Suzuki et al. ............... 428/141 |
| 5,908,700 A * | 6/1999 | Shimizu et al. .......... 428/423.1 |

FOREIGN PATENT DOCUMENTS

| | | |
|---|---|---|
| JP | A-62-33337 | 2/1987 |
| JP | 62-36727 | 2/1987 |
| JP | A-62-159338 | 7/1987 |
| JP | 62-188017 | 8/1987 |
| JP | A-62-219321 | 9/1987 |
| JP | 62-222427 | 9/1987 |
| JP | A-62-234231 | 10/1987 |
| JP | 63-146210 | 6/1988 |
| JP | 63-157313 | 6/1988 |
| JP | 63-164022 | 7/1988 |
| JP | 63-317926 | 12/1988 |
| JP | 63 317 926 | 12/1988 |
| JP | 1-109518 | 4/1989 |
| JP | A-1-119916 | 5/1989 |
| JP | A-1-276422 | 7/1989 |
| JP | 1-220120 | 9/1989 |
| JP | 1-235211 | 9/1989 |
| JP | 1-248318 | 10/1989 |
| JP | 1-300419 | 12/1989 |
| JP | 2-15415 | 1/1990 |
| JP | A-2-58727 | 2/1990 |
| JP | A-2-98816 | 4/1990 |
| JP | 2-149916 | 6/1990 |
| JP | A-2-194063 | 7/1990 |
| JP | A-2-208824 | 8/1990 |
| JP | 2 257 424 | 10/1990 |
| JP | 2-257424 | 10/1990 |
| JP | A-2-307806 | 12/1990 |
| JP | 3-5913 | 1/1991 |
| JP | 3-17817 | 1/1991 |
| JP | 3-49032 | 3/1991 |
| JP | 3-80422 | 4/1991 |
| JP | 3-88118 | 4/1991 |
| JP | A-3-157812 | 7/1991 |
| JP | A-3-219424 | 9/1991 |
| JP | 04-119521 A * | 4/1992 |
| JP | 4-271010 | 9/1992 |
| JP | 62-001115 A | 1/1998 |

* cited by examiner

MAGNETIC RECORDING TAPE WITH CONTROLLED HC AND MAGNETIC FLUX/UNIT AREA VALUE AND CONTROLLED CL/FE INTENSITY

This application is a CIP of now abandoned patent application Ser. No. 08/976,822 filed Nov. 24, 1997.

FIELD OF THE INVENTION

The present invention relates to a magnetic recording particulate medium which comprises a plastic support having provided thereon a magnetic layer comprising a ferromagnetic fine powder dispersed in a binder, and which has particularly excellent electromagnetic characteristics and durability. In particular, the present invention relates to a magnetic recording tape suitable for high density recording and reproducing of digital signals.

BACKGROUND OF THE INVENTION

Magnetic recording media are widely used as audio tapes, video tapes, computer tapes, computer discs and the like. A magnetic recording medium has become yearly higher density and the recording wavelength has become shorter and recording systems from an analog system to a digital system have been discussed.

As regarding the demand for higher density recording, a magnetic recording particulate medium formed by coating a dispersion of a ferromagnetic powder in a binder on a support has been inferior to a magnetic recording film medium, in which a magnetic recording layer comprises a vacuum deposited cobalt alloy, in electromagnetic characteristics due to low packing density of a ferromagnetic powder. However, with the improvement of the performance of ferromagnetic powders and the advancement of the coating technique of an extremely thin layer in recent years, almost the same level of electro-magnetic characteristics with those of the film medium have been achieved. Further, a magnetic recording particulate medium is superior in productivity and corrosion resistance.

Such magnetic recording particulate media are required to exhibit a high level of performances in various characteristics, such as running durability and running property, as well as electromagnetic characteristic. That is, audio tapes for sound recording/reproducing are required to have a higher degree of original sound reproducing capability. Video tapes are required to have excellent electromagnetic characteristic such as original image reproducing capability.

Magnetic recording particulate media are required to be possessed of not only such superior electromagnetic characteristics but also excellent running durability as described above. An abrasive and a lubricant are, in general, incorporated in a magnetic layer with a view to acquiring excellent running durability.

However, for obtaining excellent running durability using an abrasive, the addition amount thereof should be increased in some degree, which brings about the reduction of the packing density of a ferromagnetic powder. Further, when an abrasive having a large particle diameter is used in order to obtain excellent running durability, abrasive particles are liable to protrude excessively on the surface of the magnetic layer. Accordingly, the improvement of the running durability by an abrasive causes the deterioration of electromagnetic characteristics in some cases.

For improving the running durability by the incorporation of a lubricant such as a fatty acid and a fatty acid ester, the addition amount thereof should be increased. However, the binder is liable to be plasticized due to the increased amount of the lubricant and the durability of the magnetic layer tends to be lowered.

Further, it is a matter of course that the binder which is one of the main components of a magnetic layer also plays an important role in improving the durability and electromagnetic characteristics.

A magnetic recording particulate medium whose magnetic layer thickness is reduced by providing a nonmagnetic layer between a magnetic layer and a support is well-known. For attaining still higher recording density, a magnetic recording particulate medium having a thinner magnetic layer containing even finer ferromagnetic metal powders has been demanded. This minimization of ferromagnetic metal powders causes lowering of dispersibility leading to the degradation of the surface properties of a magnetic layer and the deterioration of electromagnetic characteristics, which makes it difficult to ensure the durability.

A binder resin having excellent durability in which a ferromagnetic metal powder and a nonmagnetic powder have excellent dispersibility and which has hardness (i.e., a high Tg and a high Young's modulus) compatible with elasticity (elongation) is most preferred as a binder for a magnetic recording particulate medium.

As a video tape suitable for a digital video cassette (DVC) of VCR for consumer use (SD specification), a tape of a magnetic recording film medium formed by a vacuum film forming technique has been nowadays put to practical use. As a tape magnetic recording particulate medium using a ferromagnetic metal powder is superior to the film medium in durability and economical point, it is very advantageous if the particulate medium is applied to DVC for consumer use. However, there is a problem such that it is very difficult with the particulate medium to stably obtain satisfactory electromagnetic characteristics, in particular, overwriting characteristics, even using a binder having excellent properties as described above.

One means for improving overwriting characteristics is to decrease coercivity (Hc) and make the thickness of a magnetic layer thin, but mere decrease of Hc leads to a decrease in saturation magnetization density of the magnetic layer, which lowers the reproduction output. That is, for improving overwriting characteristics without decreasing the reproduction output, it is necessary to increase the packing density of the magnetic fine powder contained in the magnetic layer by reducing the magnetic layer thickness or increase the saturation magnetization density of the magnetic layer by using a magnetic powder having a high degree of saturation magnetization $\sigma_s$. However, if $\sigma_s$ of the magnetic powder is increased, surface properties of the magnetic layer are degraded by the orientation disturbance of the magnetic powder due to the magnetostatic interaction between magnetic powders, and thereby the output is lowered.

That is, in the particulate medium suitable for the DVC, conditions under which satisfactory durability, reproduction output and overwriting characteristics can be stably obtained have not hitherto been found yet.

SUMMARY OF THE INVENTION

An object of the present invention is to provide a magnetic recording particulate medium having high durability and excellent electromagnetic characteristics such as reproduction output and overwriting characteristics.

The present invention can provide a magnetic recording particulate medium, in particular, a magnetic recording particulate tape for DVC (a magnetic recording particulate tape is sometimes referred to as merely a magnetic recording medium) which comprises a nonmagnetic (i.e., plastic) support having provided thereon a magnetic layer comprising a ferromagnetic metal powder dispersed in a binder, and in which the magnetic recording medium has the equal overwriting characteristics to those of the film medium, high output and low noise properties, wherein the magnetic layer has the product P of the following formula:

$$P=Hc \times \phi m$$

(wherein Hc represents a coercivity in the in-plane machine direction of said tape expressed with a unit Oersted and $\phi m$ represents saturation magnetization per unit area in the in-plane machine direction of said magnetic layer expressed with a unit Gauss·cm) in a range from 100 to 160 (Oe·G·cm) and a ratio of chlorine amount to Fe amount on a surface of said magnetic layer is equal to or less than 0.3 in terms of a Cl/Fe intensity ratio obtained by ESCA.

DETAILED DESCRIPTION OF THE INVENTION

In the present invention, P is from 100 to 160, preferably from 110 to 150, and more preferably from 120 to 140. When the P is less than 100, reproduction output, in particular, long wavelength output, is lowered, and when the P exceeds 160, overwriting characteristics are deteriorated.

Here, it is explained below that the unit of the above $\phi m$ is represented by "Gauss·cm".

In the present invention, $\phi m$ represents saturation magnetization per unit area in the in-plane machine direction of the magnetic layer.

When $\phi m$ is represented by M.K.S.A. system of units, the $\phi m$ is represented by the following equation.

$$\Phi m = Mm/A$$

wherein $\Phi m$ represents saturation magnetization per unit area in the in-plane machine direction of the magnetic layer when $\Phi m$ is represented by M.K.S.A. system of unit, and Mm represents saturation magnetization in the in-plane machine direction of the tape which is shown by the magnetic layer of the magnetic recording tape having the magnetic layer with an area of A.

In the M.K.S.A. system of units, the following equation is established.

$$Im = Mm/(A \times d/100)$$

wherein Im represents saturation intensity of magnetization, and d represents a thickness of the magnetic layer in the magnetic recording tape, expressed with unit centimeter. Accordingly, the following equation is obtained.

$$Im = Mm/(A \times d/100) = Mm/A \times 100/d = \Phi m \times 100/d$$

On the other hand, in C.G.S. electromagnetic system of units, the following equation is established.

$$Bm = 4\pi \times Im$$

wherein Bm represents saturation magnetization density, expressed with units Gauss.

Accordingly, the following equation is obtained.

$$Bm = 4\pi \times Im = 4\pi \times \Phi m \times 100/d$$

Thus, the following equation is obtained. $400\pi \times \Phi m = Bm \times d$
Here, when the relation between the above $\phi m$ of the present invention and $\Phi m$ represented by M.K.S.A. system of units is defined as $\phi m = 400\pi \times \Phi m$, the following equation is obtained.

$$\phi m = Bm \times d$$

Accordingly, the unit of the $\phi m$ of the present invention is represented by "Gauss·cm".

As means for obtaining P prescribed in the present invention, using ferromagnetic metal powders having specific surface area $S_{BET}$ as measured by the BET method and $\sigma_s$ within specified ranges, controlling the thickness of the magnetic layer, and using polyurethane resins having a specific structure as a binder resin and the like can be exemplified but means are not limited thereto.

The ferromagnetic metal powders used in the present invention preferably have $S_{BET}$ of from 30 m²/g to less than 50 m²/g, more preferably from 35 to less than 50 m²/g, and particularly preferably from 40 to less than 50 m²/g, and $\sigma_s$ of preferably from 140 to 170 emu/g, more preferably from 145 to 170 emu/g, and particularly preferably from 150 to 170 emu/g.

In the magnetic recording tape of the present invention, the another feature of the present invention is that a ratio of chlorine amount to Fe amount on a surface of said magnetic layer is equal to or less than 0.3 in terms of a Cl/Fe intensity ratio obtained by ESCA.

When the magnetic recording tape is particularly used as a magnetic recording tape of the recording and reproduction system of digital VCR for consumer use, the magnetic recording tape having less corrosion of the magnetic head, less head staining and excellent running durability is obtained by adjusting the Cl/Fe intensity ratio to such a specific range.

The adjustment of the Cl/Fe intensity ratio can be easily achieved by reducing the amount of a vinylchloride resin and increasing the amount of a polyurethane resin and polyisocyanate, as used as the binder of the magnetic layer.

Further, the adjustment of product P described above can be easily achieved by using a polyurethane resin having Tg of 80° C. or more and further one having a radius of gyration of 5 to 25 nm in a cyclohexane solution described in U.S. Pat. No. 5,876,833, preferably.

Preferred polyurethane resins for use in the present invention are polyurethane resins having a cyclic structure and an ether group, e.g., those obtained by the reaction of short chain diols (i.e., the first diols) having a cyclic structure (e.g., having a cyclic hydrocarbon group), long chain diols (i.e., the second diols) containing an ether group and diisocyanate.

It is thought that the cyclic structure of such the polyurethane resins contributes to stiffness and the ether group contributes to flexibility, as a result, the solubility is improved and the radius of gyration (broadening of a molecule) is increased, which leads to the improvement of the dispersibility of the above powders, at the same time, hardness (i.e., a high glass transition temperature Tg and a high Young's modulus) and elasticity (elongation) of the polyurethane resin per se become compatible by virtue of such the structures, thus the improvement of durability is achieved.

The polyurethane resin preferably has from 3 to 20 OH groups, and more preferably 4 or 5 groups, per a molecule. When the number of OH group is less than 3 per a molecule, as the reactivity with a polyisocyanate curing agent is lowered, the coated film strength is lowered, as a result, the durability tends to be decreased. While when it is more than 20, the solubility in a solvent is lowered and thereby the dispersibility is liable to be decreased.

A compound having three or more functional OH groups can be used for regulating the OH group content of the polyurethane resin. Specific examples include trimethylolethane, trimethylolpropane, trimellitic anhydride, glycerol, pentaerythritol, hexanetriol, etc. Examples thereof further include branched polyesters and polyether esters each having three or more functional OH groups and obtained from a dibasic acid and any of the foregoing compounds as a glycol ingredient, which are used as polyester polyol starting materials in conventional methods disclosed in JP-B-6-64726 (the term "JP-B" as used herein means an "examined Japanese patent publication"). Preferred are those having three OH groups. If the compound has four or more OH groups, gelation is liable to occur during the reaction.

The polyurethane compound preferably contains in the molecule at least one polar group selected from the group consisting of —$SO_3M$, —$OSO_3M$, —COOM, —$PO_3MM'$, —$OPO_3MM'$, —NRR', and —$N^+RR'R''COO^-$, wherein M and M' each represents a hydrogen atom, an alkali metal ion, an alkaline earth metal ion or ammonium ion, and R, R' and R'' each represents an alkyl group having from 1 to 12 carbon atoms. Particularly preferred of them are —$SO_3M$ and —$OSO_3M$. The content of the polar group is preferably from $1 \times 10^{-5}$ to $2 \times 10^{-4}$ eq/g, and particularly preferably from $5 \times 10^{-5}$ to $1 \times 10^{-4}$ eq/g. If the content is less than $1 \times 10^{-5}$ eq/g, the adsorption onto ferromagnetic powders of the polyurethane resin is insufficient, therefore, the dispersibility is lowered, while when the content is more than $2 \times 10^{-4}$ eq/g, the solubility in a solvent of the polyurethane resin is lowered and the dispersibility is decreased.

Short chain diols (i.e., the first diols) having a cyclic structure means diols having a saturated or unsaturated cyclic structure and molecular weight of less than 500, e.g., diols having an aromatic or alicyclic structure such as bisphenol A, the hydrogenated bisphenol A represented by the following formula (I), bisphenol S, bisphenol P, ethylene oxide and/or propylene oxide adducts of these bisphenols, cyclohexanedimethanol, cyclohexanediol, etc.

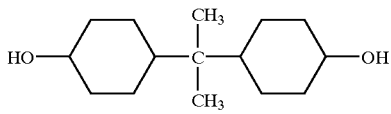
(I)

More preferred of them are the hydrogenated bisphenol A represented by formula (I) and ethylene oxide and/or propylene oxide adducts thereof.

The short chain diol (i.e., the first diols) having a cyclic structure is selected from those having a molecular weight of from 50 to less than 500, more preferably from 100 to 400, and most preferably from 100 to 300. When the molecular weight is less than 50, the magnetic layer becomes brittle and the durability is decreased. While when the molecular weight is 500 or more (that is, the case where the short chain diol (i.e., the first diol) is not used in the present invention), the glass transition temperature Tg of the magnetic layer is lowered and the polyurethane resin becomes too soft, as a result, the durability is deteriorated.

The short chain diol (i.e., the first diol) having the above-described cyclic structure may be used in combination with other diols having a molecular weight of less than 500. Specific examples thereof include straight chain or branched diols, e.g., ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, and ethylene oxide and/or propylene oxide adducts of N-diethanolamine.

A coated film having high strength, high Tg and high durability can be obtained by virtue of the cyclic structure using these compounds. Further, excellent solubility in a solvent can be obtained by the introduction of branched $CH_3$, to thereby obtain high dispersibility.

The content of the short chain diol units in the polyurethane resin is preferably from 17 to 40 wt % and more preferably from 20 to 30 wt %. If the content is less than 17 wt %, the coated film is too soft to obtain sufficient strength, which leads to the reduction of still durability. Further, when the content is more than 40 wt %, the solubility into a solvent is lowered, as a result, the dispersibility of a ferromagnetic powder becomes liable to be reduced, therefore, the electromagnetic characteristics tend to be decreased, as well as the strength of the magnetic layer obtained is lowered.

Long chain diols (i.e., the second diols) are diols having a molecular weight of 500 or more, and preferred specific examples thereof include ethylene oxide and/or propylene oxide adducts of bisphenol A, hydrogenated bisphenol A, bisphenol S and bisphenol P, polypropylene glycol, polyethylene glycol, and polytetramethylene glycol. The compound represented by the following formula (II) are particularly preferred.

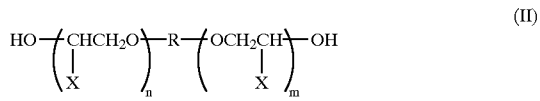
(II)

R is at least one of the following:

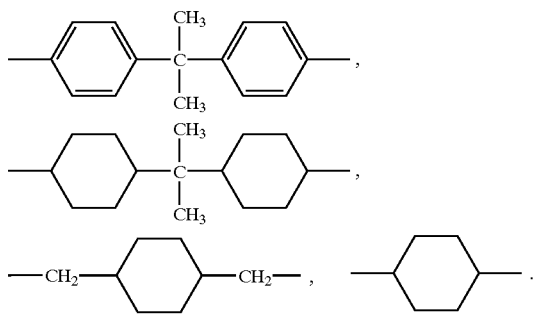

In formula (II), n and m each is a number of 3 to 24, preferably from 3 to 20, and more preferably from 4 to 15. If n or m is smaller than 3, urethane bond concentration is increased and the solubility into a solvent is reduced, the coated film is brittle, further, dispersibility and durability are decreased. If n or m is larger than 24, the coated film becomes too soft and still durability is lowered.

In the long chain diol (i.e., the second diol) represented by formula (II), R is preferably represented by the following formula (i) or (ii).

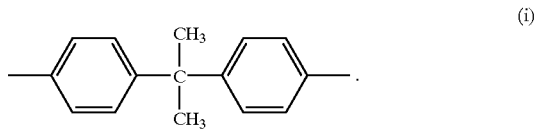
(i)

-continued

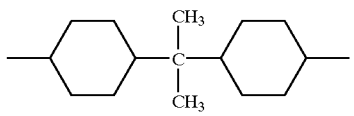
(ii)

R is more preferably represented by formula (i).

In the long chain diol (i.e., the second diol) represented by formula (II), X preferably represents a hydrogen atom or a methyl group, more preferably a methyl group. Here, all of X which are parenthesized by n or m are not always the same. For example, when n is 2, two X's may be hydrogen atoms or methyl groups, or one of two X's may be a hydrogen atom and the other may be a methyl group.

As the polyurethane resins particularly preferably used in the present invention have a cyclic structure, they can ensure high film strength and excellent durability, and further, they can have excellent solubility into a solvent and high dispersibility since they have the $CH_3$ branches of propylene introduced.

The weight average molecular weight (Mw) of the long chain diol (i.e., the second diol) is from 500 to 5,000. If the weight average molecular weight exceeds 5,000, the strength of the coated film is lowered and the film becomes too soft, as a result, the durability is decreased. Therefore, preferred weight average molecular weight is selected between 700 and 3,000.

The content of the long chain diol units containing an ether group is preferably from 10 to 50 wt %, more preferably from 30 to 40 wt %, based on the polyurethane resin. If the content is less than 10 wt %, the solubility into a solvent of the resin is lowered, leading to the reduction of the dispersibility. While when it is greater than 50 wt %, the coated film strength is lowered and, as a result, the durability is reduced. The content of the ether group contained in the long chain diol units is preferably from 1.0 to 5.0 mmol, more preferably from 2.0 to 4.0 mmol, per gram of the polyurethane resin. When the content is less than 1 mmol/g, the adsorbability onto magnetic powders is lowered and the dispersibility is reduced. On the contrary, if it is greater than 5.0 mmol/g, the solubility into a solvent is reduced, as a result, the dispersibility is decreased.

The number average molecular weight (Mn) of the polyurethane resin is preferably from 18,000 to 56,000, more preferably from 23,000 to 34,000, and the weight average molecular weight (Mw) is preferably from 30,000 to 100,000, more preferably from 40,000 to 60,000. If Mn and Mw are less than these ranges, the strength of the magnetic layer is reduced therefore the durability is reduced, while when they are greater than these ranges, the solubility into a solvent of the polyurethane resin is reduced therefore the dispersibility is reduced.

The glass transition temperature Tg of the polyurethane resin is from 0 to 200° C., preferably from 30 to 150° C., and more preferably from 80 to 130° C. When the Tg is less than 0° C., the magnetic layer strength at high temperature is decreased, as a result, the durability and the storage stability are decreased. When the Tg is greater than 200° C., the calender moldability of the resin is lowered, as a result, the electromagnetic characteristics are deteriorated.

When a binder is used in a magnetic layer, vinyl chloride-based resins (e.g., a vinyl chloride polymer or copolymer containing vinyl chloride as a recurring unit) may be used in combination with the above polyurethane resins. Vinyl chloride-based resins which can be used in combination preferably have a polymerization degree of from 200 to 600, particularly preferably from 250 to 450. Vinyl chloride-based resins copolymerized with vinyl monomers, e.g., vinyl acetate, vinyl alcohol, vinylidene chloride, acrylonitrile, etc., may be used. Further, polyurethane resins may also be used in combination with cellulose derivatives such as nitrocellulose, an acrylic resin, a polyvinyl acetal resin, a polyvinyl butyral resin, an epoxy resin, a phenoxy resin, etc. These resins may be used alone or in combination.

When polyurethane resins and polyisocyanates are used in combination with other synthetic resins, the total amounts of the polyurethane resins and the polyisocyanates in the magnetic layer of polyurethane resins is preferably from 50 to less than 100 wt %, more preferably from 80 to less than 100 wt %, based on the total amount of the binder.

In the present invention, polyisocyanate compounds, preferably organic diisocyanate, can be used as a component for forming a urethane bond of the above polyurethane resins, or as a curing agent for crosslinking polyurethane resins or other resins used in combination with each other.

Examples of organic diisocyanate compounds include aromatic diisocyanate, e.g., 2,4-tolylenediisocyanate, 2,6-tolylenediisocyanate, xylene-1,4-diisocyanate, xylene-1,3-diisocyanate, 4,4'-diphenylmethanediisocyanate, 4,4'-diphenyl ether diisocyanate, 2-nitrodiphenyl-4,4'-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate, 3,3'-dimethoxydiphenyl-4,4'-diisocyanate, etc., aliphatic diisocyanate, e.g., lysinediisocyanate, and alicyclic diisocyanate, e.g., isophoronediisocyanate, hydrogenated tolylenediisocyanate, hydrogenated diphenylmethanediisocyanate, etc.

The content of a polyisocyanate compound contained in the coating layer, e.g., the magnetic layer and the lower coating layer described below (hereinafter referred to as "a lower layer"), is preferably from 5 to 50 wt %, more preferably from 10 to 40 wt %, based on the amount of the binder (the total of the resin components and the curing agent).

When the coating layer is subjected to curing treatment by electron beam irradiation, a compound having a reactive double bond, e.g., urethane acrylate, can be used.

Tg of the magnetic layer according to the present invention is preferably from 30 to 150° C., and particularly preferably from 50 to 120° C.

The amount of the binder is generally from 15 to 40 parts by weight, more preferably from 20 to 30 parts by weight, per 100 parts by weight of the ferromagnetic powder. Further, as described later, the amount of the binder, when a lower layer is provided, is generally from 5 to 35 parts by weight based on the nonmagnetic powder or soft magnetic powder.

Examples of carbon blacks for use in the present invention include furnace black for rubbers, thermal black for rubbers, carbon black for coloring, acetylene black, etc. The carbon black for use in the present invention preferably has a specific surface area ($S_{BET}$) of from 5 to 500 m$^2$/g, a DBP absorption of from 10 to 400 ml/100 g, an average particle size of from 5 to 300 mμ, pH of from 2 to 10, a water content of from 0.1 to 10%, and a tap density of from 0.1 to 1 g/ml. Specific examples of carbon blacks for use in the present invention include BLACK PEARLES 2000, 1300, 1000, 900, 800 and 700 and VULCAN XC-72 (manufactured by Cabot Co.), #80, #60, #55, #50 and #35 (manufactured by Asahi Carbon Co.), #2400B, #2300, #900, #1000, #30, #40 and #10B (manufactured by Mitsubishi Chemical Corp.) and CONDUCTEX SC, RAVENS 150, 50, 40 and 15

(manufactured by Columbia Carbon Co., Ltd.). The carbon black for use in the present invention may previously be surface-treated with a dispersant, may be grafted with a resin, or a part of the surface thereof may be graphitized before use. The carbon black may be dispersed in a binder before addition to the magnetic coating solution. Carbon black may be used-alone or in combination. Carbon black is preferably used in an amount of from 0.1 to 30 wt % based on the amount of the ferromagnetic powder. Carbon black can serve various functions such as preventing static charges, reducing a friction coefficient, imparting a light-shielding property and improving a film strength. Such functions vary, depending upon the kind of the type of carbon black to be used. Accordingly, it is of course possible in the present invention to select and determine the kinds of the carbon blacks to be added to the magnetic layer and the following-described lower layer, as well as the respective amounts and combinations thereof on the basis of the above mentioned various properties such as the grain size, the oil absorption amount, the electroconductivity and the pH value. Regarding carbon blacks for use in the present invention, for example, the disclosure in *Handbook of Carbon Blacks* (edited by Carbon Black Association of Japan) may be referred to.

The binder resin which can be used in the present invention may be singly polyurethane or combination of polyurethane and a voluntary binder resin.

It is preferable that the resin such as a vinylchloride based resin in which a corrosive gas is formed is not used as the resin which may be combination-used with polyurethane, in view of prevention of corrosion of the thin film head and HR head. Examples of the resin which is preferably used include polyisocyanate.

In the present invention, the polyurethane content in the magnetic layer is generally from 5 to 30% by weight and preferably from 8 to 20% by weight as the so lid content, based on the ferromagnetic powders, and the content of the other resin is generally from 2 to 20% by weight and preferably from 4 to 15% by weight as the solid content, based on the ferromagnetic powders. Also, when polyisocyanate is used, the polyisocyanate is used in an amount of from 2 to 20% by weight, preferably from 3 to 10% by weight, based on the ferromagnetic powders and when polyurethane and isocyanate are combination-used, the polyurethane and isocyanate are used in a total amount of generally from 2 to 20% by weight and preferably from 2 to 10% by weight, based on the ferromagnetic powders.

It is preferable that the vinylchloride is not used. If the vinylchloride is used, the amount of the vinylchloride used is preferably 10% by weight or less based on the ferromagnetic powders.

In combination-use of polyurethane and isocyanate, the total amount of polyurethane and isocyanate used is preferably 50% by weight or more and more preferably 100% by weight, based on the total binders.

It is preferred for the magnetic layer according to the present invention to contain an abrasive. As the abrasive usable in the present invention, any known materials essentially having a Mohs' hardness of 6 or more may be used alone or in combination. Examples of such the abrasives include, for example, α-alumina having an alpha-conversion of 90% or more, β-alumina, silicon carbide, chromium oxide, cerium oxide, α-iron oxide, corundum, artificial diamond, silicon nitride; silicon carbide, titanium carbide, titanium oxide, silicon dioxide, and boron nitride. Among these, α-alumina, chromium oxide, α-iron oxide and artificial diamond are preferred. Composites composed of these abrasives (those obtained by surface-treating with other abrasives) may also be used. Compounds or elements other than the main component are often contained in the abrasives, but the intended effect can be attained so far as the content of the main component is 90% or more. Abrasives preferably have a particle size of from 0.01 to 2 μm. If desired, a plurality of abrasives each having a different grain size may be combined, or a single abrasive having a broad grain size distribution may be employed so as to attain the same effect as such a combination. Preferably, abrasives for use in the present invention are those having a tap density of from 0.3 to 2 g/ml, a water content of from 0.1 to 5%, a pH value of from 2 to 11 and a specific surface area ($S_{BET}$) of from 1 to 30 m$^2$/g.

The shape of the abrasives to be used in the present invention may be any of acicular, spherical and die-like shapes. Preferably, the abrasive has a shape partly with edges, because a high abrasive property is given. Specific examples of abrasives for use in the present invention include AKP-20, AKP-30, AKP-50, HIT-50, HIT-60, HIT-70, HIT-80, HIT-80G, HIT-100 (manufactured by Sumitomo Chemical Co., Ltd.), G5, G7 and S-1 (manufactured by Nippon Chemical Industrial Co.), and TF-100 and TF-140 (manufactured by Toda Kogyo Corp.). It is of course possible in the present invention to independently select kinds, amounts and combinations of the abrasives to be added to the following-described lower layer and the magnetic layer in accordance with the use purpose. The abrasives may be previously dispersed in a binder and the resulting dispersion may be added to the magnetic coating solution. The amount of the abrasive grains which are present on the surface and on the edges of the magnetic layer in the magnetic recording medium of the present invention is preferably 5 grains/100 μm$^2$ or more.

As other additives which can be used in the magnetic layer of the present invention, those having a lubricating effect, an antistatic effect, a dispersing effect and a plasticizing effect may be used. Examples of other additives include molybdenum disulfide, tungsten disulfide, graphite, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

Specific examples of such additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. Additionally, other additives which may be used include nonionic surfactants such as alkylene oxides, glycerols, glycidols or alkylphenol-ethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols or alkylbetains. The details of these surfactants are described in *Handbook of Surfactants* (published by Sangyo Tosho Publishing Co., Japan). These lubricants and antistatic agents may not always be 100% pure and may contain impurities such as isomers, non-reacted materials, byproducts, decomposed products and oxides, in addition to the main component. However, the content of such impurities is preferably 30% or less, more preferably 10% or less.

The kinds and amounts of these lubricants and surfactants to be used in the following-described lower layer and the magnetic layer may properly be selected in accordance with the purpose. For instance, the lower layer and the magnetic layer can separately contain different fatty acids each having a different melting point so as to prevent bleeding out of the fatty acids to the surface, or different esters each having a different boiling point or a different polarity so as to prevent bleeding out of the esters to the surface. Also, the amounts of surfactants to be used in the lower layer and the magnetic layer are controlled so as to improve the coating stability, or the amount of the lubricant in the lower layer is made larger so as to improve the lubricating effect of the surface thereof. Examples are by no means limited thereto.

All or a part of the additives to be used in the present invention may be added to the magnetic coating solution in any step of the preparation. For example, additives may be blended with a ferromagnetic powder before the kneading step, may be added during the step of kneading a ferromagnetic powder, a binder and a solvent, may be added during the dispersing step, may be added after the dispersing step, or may be added immediately before coating. According to the purpose, there is a case of capable of attaining the object by coating all or a part of the additives simultaneous with or successively after the coating of the magnetic layer. According to the purpose, lubricants may be coated on the surface of the magnetic layer after the calendering treatment or after the completion of slitting.

Examples of commercially available lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogri MB, Nonion DS-60, Anon BF, Anon LG, butyl stearate, butyl laurate and erucic acid (manufactured by Nippon Oils and Fats Co.); oleic acid (manufactured by Kanto Chemical Co.); FAL-205 and FAL-123 (manufactured by Takemoto Oils and Fats Co.); Enujerubu LO, Enujerubu IPM and Sansosyzer E4030 (manufactured by New Japan Chemical Co., Ltd.); TA-3, KF-96, KF-96L, KF-96H, KF410, KF420, KF965, KF54, KF50, KF56, KF907, KF851 X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shin-Etsu Chemical Co.); Armide P, Armide C and Armoslip CP (manufactured by Lion Ahmer Co. Ltd.); Duomin TDO (manufactured by Lion Corp.); BA-41G (manufactured by The Nisshin Oil Mills Ltd.); Profan 2012E, Newpole PE61, Ionet MS-400, Ionet MO-200, Ionet DL-200, Ionet DS-300, Ionet DS-1000 and Ionet DO-200 (manufactured by Sanyo Chemical Industries).

The organic solvents to be used in the magnetic layer or other layers at coating time may be used in an optional proportion. Examples of suitable organic solvents include ketones such as acetone, methyl ethyl ketone, methyl isobutyl ketone, diisobutyl ketone, cyclohexanone, isophorone, tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chlorofrom, ethylenechlorohydrin and dichlorobenzene; N,N-dimethylformamide, dimethylacetamide, and hexane. The organic solvents for use in the present invention may not necessarily be 100% pure and may contain impurities such as isomers, non-reacted materials, byproducts, decomposed products, oxides and water, in addition to the main component. However, the content of such the impurities is preferably 30% or less, more preferably 10% or less. The kinds of the organic solvents to be used in the magnetic layer and the lower layer are preferably the same. The contents thereof may be varied. For instance, a solvent having a high surface tension (for example, cyclohexanone or dioxane) is used in the lower layer so as to improve the coating stability. Specifically, it is essential that the arithmetic mean value of the solvent composition of the magnetic layer be higher than that of the lower layer. For the improvement of the dispersibility, the polarity is preferably high in some degree. It is preferred that a solvent having electroconductivity of from 15 to 20 is contained in an amount of 50% by weight or more of the solvent composition. The solubility parameter is preferably from 8 to 11.

The shape of the magnetic recording particulate medium according to the present invention is substantially arbitrary, e.g., any of tape, disc, sheet, and card.

The layer structure of the magnetic recording particulate medium according to the present invention may be arbitrary so far as the structure fundamentally comprises a support having provided thereon a magnetic layer. For example, the structure comprising a support having thereon a magnetic layer alone, or the structure comprising a magnetic layer and a support provided therebetween a lower layer can be exemplified. Specifically, the structure comprising a single magnetic layer, the multilayer structure comprising a plurality of magnetic layers, and the multilayer structure comprising a magnetic layer and a non-recording layers can be exemplified. Here, the magnetic layer means a layer containing a ferromagnetic powder and capable of recording/reproducing by magnetism, and the non-recording layer means a layer not substantially containing a ferromagnetic powder, i.e., a nonmagnetic layer or a soft magnetic layer usually containing a nonmagnetic powder or a soft magnetic powder.

The thickness of each layer in the layer structure is as follows, for example.

(1) In the case of a single magnetic layer: from 0.2 to 5 μm, preferably from 0.5 to 3 μm.
(2) In the case of a multilayer structure, the upper layer provided on the lower layer is a magnetic layer.
  (a) When the upper layer and the lower layer are magnetic layers:
      Upper layer: generally from 0.2 to 2 μm, preferably from 0.2 to 1.5 μm
      Lower layer: from 0.8 to 3 μm
  (b) When the upper layer is a magnetic layer and the lower layer is a nonmagnetic layer:
      Upper layer: generally from 0.05 to 1 μm, preferably from 0.05 to 0.5 μm, and more preferably from 0.1 to 0.3 μm
      Lower layer: from 0.8 to 3 μm
  (c) When the upper layer is a magnetic layer and the lower layer is a soft magnetic layer:
      Upper layer: generally from 0.05 to 1 μm, preferably from 0.1 to 0.5 μm, and more preferably from 0.1 to 0.3 μm
      Lower layer: from 0.8 to 3 μm In the present invention, a tape-like magnetic recording particulate medium having the layer thickness of from 3.0 to 8.8 μm is preferred.

When the magnetic recording particulate medium according to the present invention comprises a multilayer structure, the above-described polyurethane resins are preferably contained at least in the uppermost layer, more preferably contained in each layer.

Examples of ferromagnetic metal powders which can be used in the present invention include Fe, Ni, Fe—Co, Fe—Ni, Co—Ni, Co—Ni—Fe, etc., as alone substance or alloy powders thereof. Examples of alloy powders include those containing the following element in the range of 20% by weight or less based on the total amount of the metal component: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth. Ferromagnetic metal powders may contain a small amount of water, hydroxide, or an oxide. Methods for producing ferromagnetic powders are already well-known and ferromagnetic powders for use in the present invention can also be produced according to well-known methods.

In the present invention, ferromagnetic metal powders containing from 10 to 40 atomic % of Co, from 2 to 20 atomic % of Al, and from 1 to 15 atomic % of Y, each based on Fe, are preferably used.

Ferromagnetic metal powders have a crystallite size of generally from 80 to 200 Å, preferably from 90 to 180 Å, and particularly preferably from 120 to 170 Å. The length of a long axis is generally from 0.04 to 0.2 μm, preferably from 0.05 to 0.13 μm, and particularly preferably from 0.06 to 0.1 μm. Ferromagnetic metal powders have pH of preferably 7 or more. Ferromagnetic metal powders have a coercive force (Hc) of generally from 1,500 to 3,000 Oe, preferably from 1,950 to 2,750 Oe, and still more preferably from 2,000 to 2,300 Oe.

The shape of the ferromagnetic metal powder is not particularly limited, but it is usually an acicular shape, a granular shape, a die shape, a spindle shape or a tabular shape. The ferromagnetic metal powder having an acicular shape or a spindle shape is particularly preferably used.

Ferromagnetic metal fine powders may contain a small amount of a hydroxide or an oxide. Ferromagnetic metal fine powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium boronhydride, a hypophosphite, or hydrazine, to conduct reduction; and a method comprising evaporating a metal in a low pressure inert gas to obtain a fine powder. The thus-obtained ferromagnetic alloy powders which are subjected to any of various well-known gradual oxidization treatments can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic powders preferably have an acicular ratio of from 4 to 18, more preferably from 5 to 12, and a water content of from 0.01 to 2%. The water content of ferromagnetic powders is preferably optimized by selecting the kinds of binders.

The pH of ferromagnetic powders is preferably optimized by the combination with the binder to be used. The pH range is from 4 to 12, preferably from 7 to 10. Soluble inorganic ions (e.g., Na, Ca, Fe, Ni, Sr, etc.) are sometimes contained in ferromagnetic powders but the properties of ferromagnetic powders are not particularly affected if the content is 200 ppm or less.

Ferromagnetic powders for use in the present invention preferably have small voids and the value thereof is 20% by volume or less, more preferably 5% by volume or less.

The above-described resin components, curing agents and ferromagnetic powders are kneaded and dispersed with solvents ordinary used in the preparation of a magnetic coating solution, e.g., methyl ethyl ketone, dioxane, cyclohexanone, ethyl acetate, etc., to form a magnetic coating solution. Kneading and dispersion can be performed in accordance with conventional methods.

A magnetic coating solution may contain, in addition to the above components, an abrasive, e.g., $\alpha\text{-Al}_2\text{O}_3$, $\text{Cr}_2\text{O}_3$, etc., an antistatic agent, e.g., carbon black, a lubricant, e.g., fatty acid, fatty acid ester, silicone oil, etc., additives which are generally used such as a dispersant, or a filler.

The lower nonmagnetic layer or the lower magnetic layer in the case where the present invention employs a multilayer structure will be described below. The lower layer of the present invention preferably contains inorganic powders. Inorganic powders may be either a magnetic powder or a nonmagnetic powder.

Inorganic powders contained in the lower layer of the present invention are preferably nonmagnetic powders. They can be selected from the following inorganic compounds such as metal oxide, metal carbonate, metal sulfate, metal nitride, metal carbide, metal sulfide, etc. Examples of inorganic compounds are selected from the following compounds and they can be used alone or in combination, e.g., α-alumina having an alpha-conversion of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Of these compounds, particularly preferred are titanium dioxide, zinc oxide, iron oxide and barium sulfate, and more preferred are titanium dioxide and α-iron oxide.

Such the nonmagnetic powders preferably have a particle size of 3 μm or less. If desired, a plurality of nonmagnetic powders each having a different particle size may be combined, or a single nonmagnetic powder having a broad particle size distribution may be employed so as to attain the same effect as such a combination. A particularly preferred particle size of the nonmagnetic powders is from 0.01 to 0.2 μm. The nonmagnetic powders for use in the present invention have a tap density of from 0.05 to 2 g/ml, preferably from 0.2 to 1.5 g/ml; a water content of from 0.1 to 5 wt %, preferably from 0.2 to 3 wt %, and more preferably from 0.3 to 1.5 wt %; a pH value of from 2 to 11, particularly preferably between 7 and 10; a specific surface area ($S_{BET}$) of from 1 to 100 m$^2$/g, preferably from 5 to 70 m$^2$/g, and more preferably from 10 to 65 m$^2$/g; a crystallite size of from 0.004 to 1 μm, more preferably from 0.04 to 0.1 μm; an oil absorption amount using dibutyl phthalate (DBP) of from 5 to 100 ml/100 g, preferably from 10 to 80 ml/100 g, and more preferably from 20 to 60 ml/100 g; and a specific gravity of from 1 to 12, preferably from 3 to 6. The shape of nonmagnetic powders may be any of acicular, spherical, polyhedral, or tabular shapes.

Ignition loss of nonmagnetic powders is preferably 20 wt % or less, substantially zero is most preferred. The above-described inorganic powders for use in the present invention preferably have a Mohs' hardness of from 4 to 12. The surface roughness factor of these powders is preferably from 0.8 to 1.5, more preferably from 0.9 to 1.2. The SA (stearic acid) absorption amount of these inorganic powders is preferably from 1 to 20 μmol/m$^2$, more preferably from 2 to 15 μmol/m$^2$. The heat of wetting in water at 25° C. of nonmagnetic powders contained in the lower layer is preferably from 200 to 600 erg/cm$^2$. Solvents having the heat of wetting within this range can be used in the present invention. The appropriate number of water molecule of the surface at from 100 to 400° C. is from 1 to 10 molecules/100 Å$^2$. pH of isoelectric point in water is preferably from 3 to 9.

At least a part of the surface of these nonmagnetic powders is preferably covered with at least one compound selected from the group consisting of $Al_2O_3$, $SiO_2$, $TiO_2$, $ZrO_2$, $SnO_2$, $Sb_2O_3$, and ZnO. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation, alternatively, surface treatment of particles may be performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of nonmagnetic powders for use in the lower layer according to the present invention include Nanotite (manufactured by Showa Denko Co., Ltd.), HIT-110 and ZA-G1 (manufactured by Sumitomo Chemical Co., Ltd.), DPN-250, DPN-250BX, DPN-245, DPN-270BX, DPB-550BX, and DPN-550RX (manufactured by Toda Kogyo Corp.), titanium oxide TTO-51B, TTO-55A, TTO-55B, TTO-55C, TTO-55S, TTO-55D, SN-100, MJ-7, α-iron oxide E-270, E271, and E300 (manufactured by Ishihara Sangyo Kaisha Ltd.), STT-4D, STT-30D, STT-30, and STT-65C (manufactured by Titan Kogyo Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), 100A and 500A (manufactured by Ube Industries Co., Ltd.), and Y-LOP and calcined product thereof (manufactured by Titan Kogyo Co., Ltd.).

Particularly preferred nonmagnetic powders are titanium dioxide and α-iron oxide. Preparation of α-iron oxide (hematite) is performed as follows. α-$Fe_2O_3$ powders are obtained from acicular goethite particles as precursor particles. Goethite particles are obtained by any of the following ordinary methods: (1) a method in which an aqueous alkali hydroxide solution is added to an aqueous ferrous salt solution in equivalent or more amount to thereby obtain a suspension containing ferrous hydroxide colloid, then an oxygen-containing gas is introduced to the suspension obtained at pH 11 or more and at 80° C. or less to form acicular goethite particles by the oxidation reaction, (2) a method in which an aqueous ferrous salt solution is reacted with an aqueous alkali carbonate solution to thereby obtain a suspension containing $FeCO_3$, then an oxygen-containing gas is introduced to the suspension obtained to form spindle-like goethite particles by the oxidation reaction, (3) a method in which an aqueous alkali hydroxide solution or an aqueous alkali carbonate solution is added to an aqueous ferrous salt solution in the amount of less than equivalent, thereby an aqueous ferrous salt solution containing ferrous hydroxide colloid is obtained, then an oxygen-containing gas is introduced to the aqueous ferrous salt solution obtained to form acicular goethite nucleus particles by the oxidation reaction, thereafter an aqueous alkali carbonate solution is added to the aqueous ferrous salt solution containing said acicular goethite nucleus particles in the amount of equivalent or more based on $Fe^{2+}$ in said aqueous ferrous salt solution, then again an oxygen-containing gas is introduced to said aqueous ferrous salt solution to grow said acicular goethite nucleus particles, and (4) a method in which an aqueous alkali hydroxide solution or an aqueous alkali carbonate solution is added to an aqueous ferrous salt solution in the amount of less than equivalent, thereby an aqueous ferrous salt solution containing ferrous hydroxide colloid is obtained, then an oxygen-containing gas is introduced to the aqueous ferrous salt solution obtained to form acicular goethite nucleus particles by the oxidation reaction, thereafter the acicular goethite nucleus particles are grown in an acidic or neutral area.

Further, different kinds of elements such as Ni, Zn, P or Si, which are generally added to the reaction solution during the goethite particle-forming reaction for improving the properties of the particle powder, may be contained.

Acicular α-$Fe_2O_3$ particles can be obtained by dehydrating acicular goethite particles, which are precursor particles, in the range of 200 to 500° C. and further, if necessary, annealing the particles by heat treatment at 350 to 800° C.

A sintering inhibitor such as P, Si, B, Zr or Sb may be adhered to the surface of acicular goethite particles to be dehydrated or annealed.

The reason why annealing by heat treatment at 350 to 800° C. is conducted is because it is preferred to fill the voids which have occurred on the surface of acicular α-$Fe_2O_3$ particles obtained by the dehydration by melting the extreme surface of particles to obtain smooth surfaces.

The α-Fe$_2$O$_3$ particle powder for use in the present invention can be obtained by dispersing acicular α-Fe$_2$O$_3$ particles obtained by dehydration or annealing in an aqueous solution to make a suspension, adding Al compounds and adjusting the pH, covering the surface of acicular α-Fe$_2$O$_3$ particles with the above-described additives, filtering, washing, drying, pulverizing and, if necessary, performing other treatments such as deaeration, compaction and the like. Aluminum salt such as aluminum acetate, aluminum sulfate, aluminum chloride, and aluminum nitride, and aluminic acid alkali salt such as sodium aluminate can be used as the aluminum compound to be used. In this case, the addition amount of Al compounds is from 0.01 to 50% by weight in terms of Al based on the α-Fe$_2$O$_3$ powder. If the content is less than 0.01% by weight, dispersion in the binder resin is insufficient and if it exceeds 50% by weight, Al compounds suspending around surfaces of particles unfavorably interact with each other. The inorganic nonmagnetic powder for use in the lower layer according to the present invention may be covered with one or two or more selected from the group consisting of P, Ti, Mn, Ni, Zn, Zr, Sn and Sb, as well as Si compound, together with Al compounds. The content of these compounds used together with Al compounds is each from 0.01 to 50% by weight based on the α-Fe$_2$O$_3$ particle powder. If the content is less than 0.01% by weight, the improvement of dispersibility by the addition can hardly be obtained, and if it exceeds 50% by weight, Al compounds suspending around surfaces of particles unfavorably interact with each other.

The producing method of titanium dioxide is as follows. The producing method of titanium dioxide mainly comprises a sulfuric acid process and a chlorine process. A sulfuric acid process comprises digesting raw ores of ilmenite and extracting Ti and Fe as sulfate. Iron sulfate is removed by crystallization-separation, the resulting titanyl sulfate is purified by filtration, water-containing titanium oxide is precipitated by thermal hydrolysis, the precipitated product is filtrated and washed, impurities are removed by washing, then a particle size-adjusting agent is added and calcined at 80 to 1,000° C., thereby crude titanium is obtained. A rutile type and an anatase type are separated by the kind of nucleating agent added at hydrolysis. This crude titanium is pulverized, graded, and surface treated. In a chlorine process, natural rutile and synthetic rutile are used as raw ores. Ores are chlorinated in a high temperature reduction state, Ti becomes TiCl$_4$ and Fe becomes FeCl$_2$, and the iron oxide solidified by cooling is separated from the liquid TiCl$_4$. The crude TiCl$_4$ obtained is purified by fraction, then a nucleating agent is added thereto and reacted with oxygen instantaneously, thereby crude titanium oxide is obtained. The finishing method for imparting to the crude titanium formed in the oxidation decomposition process the property of pigment is the same as the sulfuric acid process.

After the above titanium oxide material is dry ground, water and a dispersant are added, grains are wet ground, and coarse grains are classified by means of a centrifugal separator. Subsequently, a fine grain slurry is put in a surface treatment bath and surface covering with metal hydroxide is conducted here. In the first place, a predetermined amount of an aqueous solution of salts such as Al, Si, Ti, Zr, Sb, Sn, Zn is added to the tank, acid or alkali is added to neutralize the solution, and surfaces of titanium oxide particles are covered with the water-containing oxide produced. The water-soluble salts by-produced are removed by decantation, filtration and washing, the pH of the slurry is adjusted finally and filtrated, and washed with pure water. The washed cake is dried using a spray drier or a band drier. The dried product is finally ground by jet milling, thereby the product is obtained. Besides the water system, it is also possible to perform surface treatment by introducing AlCl$_3$ and SiCl$_4$ vapor to the titanium oxide powder, then water vapor is flowed to conduct surface treatment with Al and Si. With respect to the producing method of pigments thereafter, G. D. Parfitt and K. S. W. Sing, *Characterization of Powder Surfaces*, Academic Press (1976) can be referred to.

By the incorporation of carbon black into the lower nonmagnetic layer, a desired micro Vickers' hardness can be obtained in addition to the well-known effects reducing Rs and light transmittance.

A micro Vickers' hardness of the lower nonmagnetic layer is generally from 25 to 60 kg/mm$^2$, preferably from 30 to 50 kg/mm$^2$ for regulating head touching. Measurement of a micro Vickers' hardness is conducted by means of a thin film hardness meter HMA-400 manufactured by NEC Co., Ltd. which uses a diamond-made triangular pyramid needle having an edge angle of 80° and a tip radius of 0.1 μm provided at the tip of the indentator. Light transmittance is standardized such that the absorption of infrared ray of wavelength of 900 nm or so is in general 3% or less, e.g., the absorption in VHS should be 0.8% or less. Furnace black for rubbers, thermal black for rubbers, carbon black for coloring, acetylene black, etc. can be used therefor.

The carbon black for use in the nonmagnetic layer according to the present invention has a specific surface area ($S_{BET}$) of from 100 to 500 m$^2$/g, preferably from 150 to 400 m$^2$/g, a DBP absorption of from 20 to 400 ml/100 g, preferably from 30 to 200 ml/100 g, an average particle size of from 5 to 80 mμ, preferably from 10 to 50 mμ, and more preferably from 10 to 40 mμ, pH of from 2 to 10, a water content of from 0.1 to 10%, and a tap density of from 0.1 to 1 g/ml. Specific examples of carbon blacks for use in the present invention include BLACKPEARLES 2000, 1300, 1000, 900, 800, 880 and 700 and VULCAN XC-72 (manufactured by Cabot Co.), #3050B, #3150B, #3250B, #3750B, #3950B, #950, #650B, #970B and #850B, MA-600 (manufactured by Mitsubishi Chemical Corp.) CONDUCTEX SC, RAVENS 8800, 8000, 7000, 5750, 5250, 3500, 2100, 2000, 1800, 1500, 1255 and 1250 (manufactured by Columbia Carbon Co., Ltd.), and Ketjen Black BC (manufactured by Akzo Co., Ltd.). The carbon black for use in the present invention may previously be surface-treated with a dispersant, may be grafted with a resin, or a part of the surface thereof may be graphitized before use. The carbon black may be dispersed in a binder before addition to the magnetic coating solution. Carbon black can be used within the range not exceeding 50% by weight based on the above inorganic powders and not exceeding 40% by weight based on the total weight of the nonmagnetic layer. Carbon black can be used alone or in combination.

Regarding carbon blacks for use in the present invention, for example, the disclosure in *Handbook of Carbon Blacks* (edited by Carbon Black Association of Japan) may be referred to.

Organic powders can be used in the lower layer according to the purpose. Examples of such the organic powders include an acrylic acid resin powder, a benzo-guanamine resin powder, a melamine resin powder, and a phthalocyanine pigment. In addition, a polyolefin resin powder, a polyester resin powder, a polyamide resin powder, a polyimide resin powder, and a polyethylene fluoride resin powder can also be used. The producing methods thereof are disclosed in JP-A-62-18564 and JP-A-60-255827 (the term "JP-A" as used herein means an "unexamined published Japanese patent application").

An undercoating layer is provided in a usual magnetic recording medium for the purpose of improving the adhesive strength between the support and the magnetic layer or the lower nonmagnetic layer. Polyesters soluble to a solvent are used for this sake, and the thickness is in general 0.5 μm or less.

Binders, lubricants, dispersants, additives, solvents, dispersing methods, etc., used in the magnetic layer can be used in the lower layer. In particular, with respect to the amounts and the kinds of binders, additives, the amounts and the kinds of dispersants, well-known prior art techniques regarding the magnetic layer can be applied in the lower layer.

Thermoplastic resins having a glass transition temperature of from −100 to 150° C., a number average molecular weight of from 1,000 to 200,000, preferably from 10,000 to 100,000, a polymerization degree of about 50 to 1,000 can be used in the present invention. Examples thereof include polymers or copolymers containing the following compounds as a constituting unit, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal, vinyl ether, etc., and polyurethane resins and various rubber resins.

Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resin and isocyanate prepolymer, mixtures of polyesterpolyol and polyisocyanate, and mixtures of polyurethane and polyisocyanate. The details for these resins are described in *Plastic Handbook*, Asakura Shoten. It is also possible to use known electron beam curable type resins in the lower coating layer or an upper magnetic layer.

These resins can be used alone or in combination. Examples of preferred combinations include at least one selected from vinyl chloride resins, vinyl chloride-vinyl acetate resins, vinyl chloride-vinyl acetate-vinyl alcohol resins, and vinyl chloride-vinyl acetate-maleic anhydride copolymers with polyurethane resins, or combinations of these resins with polyisocyanate. As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, polyolefin polyurethane, etc. Those polyurethane resins having a cyclic structure and an ether group are particularly preferred. Preferably, at least one or more polar groups selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$^2$, —N$^+$R$^3$ (R represents a hydrocarbon group), an epoxy group, —SH, —CN, sulfobetaine, phosphobetaine, or carboxybetaine. The content of the polar group is from about $10^{-1}$ to $10^{-8}$ mol/g, preferably from $10^{-2}$ to $10^{-6}$ mol/g.

Specific examples of binders for use in the present invention include VAGH, VYHH, VMCH, VAGF, VAGD, VROH, VYES, VYNC, VMCC, XYHL, YXSG, PKHH, PKHJ, PKHC, and PKFE (manufactured by Union Carbide Co., Ltd.), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W, DX80, DX81, DX82, DX83, and 100FD (manufactured by Electro Chemical Industry Co., Ltd.), MR-104, MR-105, MR-110, MR-100, and 400X-110A (manufactured by Nippon Zeon Co., Ltd.), Nippollan N2301, N2302, and N2304 (manufactured by Nippon Polyurethane Co., Ltd., Japan), Pandex T-5105, T-R3080, T-5201, Burnock D-400, D-210-80, Crisvon 6109 and 7209 (manufactured by Dainippon and Chemicals, Ink Co., Ltd.), Vylon UR8200, UR8300, RV530, and RV280 (manufactured by Toyobo Co., Ltd., Japan), Daipheramine 4020, 5020, 5100, 5300, 9020, 9022, and 7020 (manufactured by Dainichi Seika K.K.), MX5004 (manufactured by Mitsubishi Chemical Corp.), Sunprene SP-150 and TIM-3003 (manufactured by Sanyo Chemical Industries Co. Ltd.), Salan F310 and F210 (manufactured by Asahi Chemical Industry Co., Ltd.), etc. Of these, preferred are MR-104, MR-110, UR-8200, UR-8300, UR-8700, and reaction products containing diols and organic diisocyanate as main components, and polyurethane having a cyclic structure and an ether group is preferred.

The above is the explanation of the case when the lower layer is a nonmagnetic layer. Specific examples of soft magnetic powders to be contained in the lower layer include granular Fe, Ni, granular magnetite, Fe—Si, Fe—Al, Fe—Ni, Fe—Co, Fe—Co—Ni, Fe—Al—Co (Sendust) alloy, Mn—Zn ferrite, Ni—Zn ferrite, Mg—Zn ferrite, Mg—Mn ferrite, and those described in Akinobu Chikazumi, *Physics of Ferromagnetic Substances* (the last vol.), *Magnetic Properties and Applications*, pp. 368 to 376, Shoka-bo, Japan (1984).

These nonmagnetic powders and soft magnetic powders are preferably covered with at least one compound selected from the group consisting of $Al_2O_3$, $SiO_2$, $TiO_2$, $ZrO_2$, $SnO_2$ $Sb_2O_3$, and ZnO. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation, alternatively, surface treatment of particles may be performed to be covered with alumina in the first place, then the alumina-covered surface is covered with silica, or vice versa, according to purposes. The surface covering layer may be porous layer, if necessary, but a homogeneous and dense surface is generally preferred.

The lower layer according to the present invention may also contain magnetic powders as an inorganic powder. Magnetic powders which can be used include γ-$Fe_2O_3$, Co-modified γ-$Fe_2O_3$, alloy containing α-Fe as a main component, and $CrO_2$. The magnetic powders of the lower layer can be selected according to the purpose, and the effect of the present invention does not depend upon the kind of magnetic powders. However, properties of the upper and lower layers are varied according to respective purposes. For instance, it is preferred to set up Hc of the lower magnetic layer lower than that of the upper magnetic layer for improving long wavelength recording properties, and making Br of the lower magnetic layer higher than that of the upper magnetic layer is effective. Besides, various advantages can be obtained by adopting conventional multilayer structures.

A support according to the present invention is preferably a nonmagnetic plastics support and has a micro Vickers' hardness of 75 kg/mm$^2$ or more and well-known films can be used, e.g., biaxially oriented polyethylene naphthalate, polyamide, polyimide, polyamideimide, aromatic polyamide, and polybenzoxazole. In particular, a nonmagnetic support using aromatic polyamide or polyethylene naphthalate, which are available from Toray Industries Inc. as "Aramide" and from Asahi Chemical Industry Co., Ltd. as "Aramica" are preferred.

The nonmagnetic support may be previously treated with corona discharge treatment, plasma treatment, adhesion-enhancing treatment, heat treatment, or dust-removing treatment. The nonmagnetic support for use in the present invention has a center line average surface roughness of the side of the nonmagnetic support on which a magnetic layer is coated of from 0.1 nm to 10 nm, preferably from 0.2 nm to 6 nm, and more preferably from 0.5 nm to 4 nm. Further, it is desired that the nonmagnetic support for use in the present invention not only has a small center line average surface roughness but also is free from coarse protrusions of 1 μm or more on the surface thereof. The surface roughness of the support may be independently controlled in accordance with the size and amount of the filler to be added to the support. Examples of fillers usable for this purpose include oxides or carbonates of Al, Ca, Si or Ti as well as organic fine powders of organic substances such as acrylic materials and melamine materials, they may be either crystalloid or amorphous. The surface roughness of the side on which the backing layer is coated is preferably coarser than that of the side on which the magnetic layer is coated to make compatible with running durability. The center line average surface roughness of the backing layer-coated side is preferably 1 nm or more, more preferably 4 nm or more. The surface roughness of the magnetic layer-coated side and the backing layer-coated side may be varied using a dual structural support, or may be varied by providing a coating layer.

The support for use in the present invention preferably has an F-5 value of from 10 to 50 kg/mm$^2$ in the tape-running direction and an F-5 value of from 10 to 30 kg/mm$^2$ in the transverse direction of the tape. In general, the F-5 value in the machine direction of the tape is higher than that in the transverse direction thereof. However, this arrangement does not apply to the case where the transverse strength of tape is intended to be especially elevated. The thermal shrinkage at 100° C. for 30 minutes of the nonmagnetic support for use in the present invention is preferably 3% or less and more preferably 1.5% or less, in both the tape-running direction and the widthwise direction and further the thermal shrinkage at 80° C. for 30 minutes is preferably 1% or less, more preferably 0.5% or less in both directions. The breaking strength of the support is preferably from 5 to 100 kg/mm$^2$ in both directions, and the modulus of elasticity thereof is preferably from 100 to 2,000 kg/mm$^2$ in both directions. Further, the light transmittance at 900 nm is preferably 30% or less, more preferably 3% or less.

A back coating layer (a backing layer) comprising inorganic particles and a binder may be provided on the back surface of the support which is opposite to the magnetic layer-coated surface side. A back coating layer is a layer provided on the side of the support on which a magnetic coating is not coated. The back coat is provided by coating a coating solution for a backing layer comprising granular components, e.g., an abrasive and an antistatic agent, and a binder dissolved in an organic solvent. As granular components, various inorganic pigments and carbon black can be used, and alone or mixtures of various resins such as nitrocellulose, phenoxy resins, vinyl chloride resins, polyurethane resins are used as a binder.

When a magnetic recording particulate medium of the present invention is a tape-like medium, a back coating layer is preferably provided.

Moreover, an adhesive layer may be provided on the coating surfaces of the magnetic coating solution and a back coating layer-forming coating solution on the nonmagnetic support.

The process of preparing the magnetic layer-coating compositions for use in the magnetic recording medium of the present invention comprises at least a kneading step, a dispersing step and optionally blending steps to be carried out before and/or after the kneading and dispersing steps. Any of these respective steps may be composed of two or more separate stages. Materials such as a ferromagnetic powder, a binder, carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For achieving the object of the present invention, the above steps can be performed partly with conventional techniques. However, high remanent flux density (Br) of the magnetic recording particulate medium of the present invention can be obtained for the first time using powerful kneading machines such as a continuous kneader or a pressure kneader. When a continuous kneader or a pressure kneader is used, all or a part of ferromagnetic powders and binders (preferably 30% or more of the total binders) are kneading treated in the range of from 15 parts to 500 parts per 100 parts of ferromagnetic powders. Details of these kneading are disclosed in JP-A-1-166338 and U.S. Pat. No. 5,300,244. When preparing a magnetic layer solution, a nonmagnetic layer solution, and abrasives, dispersing media having a high specific gravity is preferably used and zirconia beads are very suitable for this purpose.

Examples of apparatuses and methods of coating a multilayer structure as in the present invention are described below.

1. In the first place, the lower coat layer is coated by gravure coating, roll coating, blade coating, or extrusion coating, which are ordinarily used in the coating of a magnetic coating solution, and the upper magnetic layer is coated while the lower coating layer is still wet by means of the support pressing type extrusion coating apparatus disclosed in U.S. Pat. Nos. 4,480,583; 4,681,062; and 5,302,206.

2. The upper layer and the lower layer are coated almost simultaneously using the coating head equipped with two slits feeding coating solution as disclosed in U.S. Pat. Nos. 4,854,262; 5,072,688; and 5,302,206.

3. The upper layer and the lower layer are coated almost simultaneously using the extrusion coating apparatus equipped with a backup roll as disclosed in JP-A-2-174965.

For preventing the reduction of the electromagnetic characteristics of the magnetic recording pariculate medium due to agglomeration of magnetic powders, it is preferred to impart shear to the coating solution in the coating head by methods as described in U.S. Pat. No. 4,828,779 and JP-A-1-236968. In the viscosity of the coating solution, the range of the numeric values disclosed in U.S. Pat. No. 4,994,306 should be satisfied.

The magnetic layer of the magnetic recording particulate medium according to the present invention is necessary to be subjected to strong orientation. It is preferred to dispose a selenoid of 1,000 G or more, preferably 3,000 G or more, and a cobalt magnet with the same pole and opposed position, and it is preferred that orientation is performed by magnetic fields of 2,000 G or more, preferably 4,000 G or more, and more preferably 6,000 G or more. It is also preferred to provide appropriate drying step before orientation such that the orientation after drying becomes highest. It is known that inclining the axis of easy magnetization in a vertical direction is effective for high density recording, irrespective of acicular or tabular, and combination with this is also effective.

Before simultaneous multilayer coating of a nonmagnetic layer and a magnetic layer, provision of an adhesive layer comprising a polymer as a main component and corona discharge treatment and irradiation of UV and EB are preferably combined for increasing adhesive strength.

Use of heat resisting plastic rolls such as epoxy, polyimide, polyamide, polyimideamide is effective for calendering treatment. Metal rolls are also usable for the treatment. Temperature of treatment is preferably from 70 to 120° C., more preferably from 80 to 100° C. Line pressure is preferably from 200 to 500 kg/cm, more preferably from 300 to 400 kg/cm.

The surface of the magnetic layer and the opposite surface thereof of the magnetic recording particulate material of the present invention have a friction coefficient to SUS420J of preferably from 0.1 to 0.5, more preferably from 0.2 to 0.3. The surface inherent resistivity is preferably from $10^4$ to $10^{12}$ Ω/sq, the modulus of elasticity at 0.5% elongation of the magnetic layer is preferably from 100 to 2,000 kg/mm² both in the running direction and the transverse direction, the breaking strength is preferably from 1 to 30 kg/cm², the modulus of elasticity of the magnetic recording particulate medium is preferably from 100 to 1,500 kg/mm² both in the running direction and the transverse direction, the residual elongation is preferably 0.5% or less, and the thermal shrinkage at every temperature of 100° C. or less is preferably 1% or less, more preferably 0.5% or less, and most preferably 0.1% or less, ideally 0%. The glass transition temperature of the magnetic layer (the maximum of modulus of elasticity loss by dynamic visco-elasticity measurement at 110 Hz) is preferably from 30° C. to 150° C., and that of the lower coating layer is preferably from 0° C. to 100° C. The modulus of elasticity loss is preferably within the range of from $1 \times 10^8$ to $8 \times 10^9$ dyne/cm², and loss tangent is preferably 0.2 or less.

If loss tangent is large, adhesion failure is liable to occur. The residual amount of solvent in the magnetic layer is preferably 100 mg/m² or less, more preferably 10 mg/m² or less, and the residual solvent amount in the upper magnetic layer is preferably smaller than that in the lower coating layer. The void ratio is preferably 30% by capacity, more preferably 20% by capacity, with any of the nonmagnetic lower coating layer and the magnetic layer. The void ratio is preferably smaller but in some cases a specific value is preferably secured depending on purposes. For example, in a magnetic recording particulate medium for recording data which are repeatedly used, large void ratio contributes to good durability in many cases.

A tape-like magnetic recording particulate medium which is particularly preferred embodiment of the present invention exhibits the squareness ratio in the machine direction of 0.85 or more and switching field distribution (abbreviated to SFD) in the machine direction of 0.41 or less when measured at the magnetic field of 10 KOe by Vibrating Sample Magnetometer (VSM). Therefore, recording can be performed deep in the magnetic layer and overwriting characteristics can be improved by increasing the orientation of the magnetic powder, conducting reversal of magnetization sharply and uniformly in the thickness depth direction of the magnetic layer.

As means for attaining SFD of 0.41 or less in the machine direction of the magnetic recording particulate medium, the following can be enumerated.

(1) Orientation is conducted immediately after coating of the magnetic layer with a permanent magnet of 5,000 Gauss or less.

(2) Before dispersion by a sand grinder, kneading operation using an open kneader or a continuous kneader is carried out.

(3) When dispersion is conducted with a sand grinder, dispersing media having a specific gravity of 2.5 or more, preferably dispersion beads containing $ZrO_2$ as a main component, are used.

(4) Dispersion of the ferromagnetic powder and the nonmagnetic powders is conducted separately, and then each of the predetermined amount is blended and dispersion is further continued.

(5) SFD of the ferromagnetic powder is suppressed to 0.6 or less.

(6) If the length of the long axis is from 0.05 to 0.13 μm long magnetic powders having a crystallite size of 200 Å or less are selected.

The above squareness ratio is more preferably from 0.85 to 0.95, most preferably from 0.86 to 0.92.

More preferred range of SFD is from 0.1 to 0.35, most preferably from 0.15 to 0.30.

Two squareness ratios in the two directions making a right angle with the running direction of the tape, i.e., the direction parallel with the tape surface and crossing the tape orthogonally and the direction vertical to the tape surface, are preferably 80% or less. Remanence coercivity (Hr) in the machine direction is also preferably from 1,800 Oe 3,000 Oe. Hc and Hr in the vertical direction are preferably from 1,000 Oe to 5,000 Oe.

It is preferred that the RMS surface roughness ($R_{RMS}$) of the magnetic layer which is measured using AFM (atomic force microscope) is from 2 nm to 15 nm.

When the magnetic recording particulate medium according to the present invention, the saturation magnetization φm is preferably from 0.03 to 0.13 G·cm.

The problem such that ferrite used in the recording/reproduction head of VCR for consumer use is liable to be corroded is related to the surface chlorine content thereof, therefore, this problem has been solved by reducing the ratio of the surface chlorine content to the Fe amount to 0.3 or less, preferably 0.2 or less, in terms of intensity ratio obtained by ESCA.

Further, it is preferred to maintain the mechanical strength of the tape using vinyl chloride resin/urethane resin in the lower layer and to reduce the vinyl chloride content in the uppermost magnetic layer. Due to this structure, the content of the chlorine atom in the magnetic layer can be reduced without impairing the mechanical strength of the tape. Further, the problem can be solved in some degree by removing the excess binder in the surface layer by a surface treatment even if a vinyl chloride resin is used in the uppermost magnetic layer.

The binder resin for use in the magnetic layer of the present invention may be the above-described polyurethane resin alone or in combination with other resins. It is preferred to avoid the use of resins which generate a corrosive gas as vinyl chloride resin as the resins to be used in combination to prevent the corrosion of thin film head and MR head.

Saturation magnetization measured under outer magnetic field of 10 KOe is from 0.03 to 0 13 g·cm, preferably from 0.04 to 0.10.

The coercivity (Hc) of the magnetic layer is preferably from 2,000 to 3,000 Oe, and most preferably from 2,000 to 2,800 Oe.

The surface roughness Ra of the magnetic layer measured using 3D MIRAU (manufactured by WYCO) is equal to or less than 4 nm and preferably equal to or less than 3 nm.

In the following examples and comparative examples, "part" means "part by weight" and "%" means "% by weight".

EXAMPLES 1 TO 6

Comparative Examples 1 and 2

Example 1

| Upper Magnetic Layer Coating Solution | |
| --- | --- |
| Ferromagnetic metal powder<br>Fe/Co, atomic ratio: 100/30,<br>Al/Fe, atomic ratio: 7.7/100,<br>Y/Fe, atomic ratio: 6.8/100<br>Hc: 2,250 Oe<br>$S_{BET}$: 45 m$^2$/g<br>Crystallite size: 170 Å<br>Length of long axis: 0.09 μm<br>Acicular ratio: 8<br>$\sigma_s$: 156 emu/g | 100 parts |
| Vinyl chloride copolymer<br>MR110, (manufactured by Nippon Zeon<br>Co., Ltd., Japan) | 10 parts |
| Polyurethane resin A (shown in Table 1) | 6 parts |
| α-Al$_2$)$_3$ (average particle size: 0.15 μm) | 5 parts |
| Carbon black (average particle size: 80 nm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |
| Lower Layer Coating Solution | |
| Nonmagnetic powder, α-Fe$_2$O$_3$<br>Length of long axis: 0.15 μm<br>$S_{BET}$: 52 m$^2$/g<br>pH: 8<br>Tap density: 0.8<br>DBP oil absorption: 27 to 38 ml/100 g<br>Surface-covering compound: Al$_2$O$_3$, SiO$_2$ | 80 parts |
| Carbon black<br>Average primary particle size: 16 nm<br>DBP oil absorption: 120 ml/100 g<br>pH: 8.0<br>$S_{BET}$: 250 m$^2$/g<br>Volatile content: 1.5% | 20 parts |
| Vinyl chloride copolymer<br>MR104, (manufactured by Nippon Zeon<br>Co., Ltd., Japan) | 12 parts |
| Polyurethane resin A (shown in Table 1) | 5 parts |
| α-Al$_2$O$_3$ (average particle size: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

TABLE 1

| Polyurethane Resin A | |
| --- | --- |
| Molecular weight: 36,000, Tg: 94° C.<br>Structure | |
| Hydrogenated bisphenol A | 0.6 mol |
| Polypropylene oxide adduct of bisphenol A | 0.3 mol |
| Sodium salt of bis(2-hydroxethyl)5-<br>sulfoisophthalate | 0.05 mol |
| Diphenymethanediisocyanate (MDI) | 1.0 mol |
| Trimethylolpropane | 0.05 mol |
| —SO$_3$Na group (6.0 × 10$^{-5}$ eq/q) | |

The above compositions of the coating solutions for the upper layer and the lower layer were respectively blended in an open kneader, then dispersed with a sand mill. To each resulting dispersion was added 5 parts of polyisocyanate (Coronate L, manufactured by Nippon Polyurethane Co., Ltd., Japan), further, 40 parts of a mixed solution of methyl ethyl ketone and cyclohexanone was added. Each solution was filtered through a filter having an average pore diameter of 1 μm to obtain coating solutions for the upper and the lower layers.

These coating solutions were simultaneously multilayer-coated on a polyethylene naphthalate support having a thickness of 5.2 μm and a center line average surface roughness of 0.001 μm of the side on which a magnetic layer was to be coated. The lower layer coating solution was coated in a dry thickness of 1.5 μm, immediately thereafter the upper magnetic layer coating solution was coated on the lower layer so as to give the magnetic layer having a thickness of 0.13 μm. Magnetic powders were oriented with a cobalt magnet having a magnetic force of 5,000 G and a solenoid having a magnetic force of 4,000 G while both layers were still wet. After drying, the coated layer was subjected to calendering treatment with calenders of 7 stages comprising metal rolls and epoxy resin rolls at 100° C. at a rate of 200 m/min. Then, a backing layer having a thickness of 0.5 μm was coated. The obtained web was slit to a width of 6.35 mm to prepare a DVC video tape.

Example 2

A DVC video tape was prepared in the same manner as in Example 1 except that the following ferromagnetic metal powders were used.

Ferromagnetic metal powder 100 parts
  Fe/Co, atomic ratio: 100/30,
  Al/Fe, atomic ratio: 10/100,
  Si/Fe, atomic ratio: 1/100
  Y/Fe, atomic ratio: 6/100
  Hc: 2,150 Oe
  $S_{BET}$: 49 m$^2$/g
  Crystallite size: 160 Å
  Length of long axis: 0.09 μm
  Acicular ratio: 7
  $\sigma_s$: 150 emu/g

Example 3

A DVC video tape was prepared in the same manner as in Example 1 except that the following ferromagnetic metal powders were used.

Ferromagnetic metal powder 100 parts
  Fe/Co, atomic ratio: 100/30,
  Al/Fe, atomic ratio: 12/100,
  Si/Fe, atomic ratio: 0.5/100
  Y/Fe, atomic ratio: 7/100
  Hc: 2,200 Oe
  $S_{BET}$: 50 m$^2$/g
  Crystallite size: 120 Å
  Length of long axis: 0.06 μm
  Acicular ratio: 6
  $\sigma_s$: 140 emu/g

Comparative Example 1

A DVC video tape was prepared in the same manner as in Example 1 except that the thickness of the magnetic layer was increased to outside of the scope of the present invention.

Comparative Example 2

A DVC video tape was prepared in the same manner as in Example 1 except that the thickness of the magnetic layer was increased to outside of the scope of the present invention.

Example 4

A DVC video tape was prepared in the same manner as in Example 1 except that the following ferromagnetic metal powders were used.

Ferromagnetic metal powder 100 parts
  Fe/Co, atomic ratio: 100/30,
  Al/Fe, atomic ratio: 10/100,
  Y/Fe, atomic ratio: 6/100
  Hc: 2,150 Oe
  $S_{BET}$: 59 m²/g
  Crystallite size: 95 Å
  Length of long axis: 0.04 μm
  Acicular ratio: 4
  $\sigma_s$: 140 emu/g

Example 5

A DVC video tape was prepared in the same manner as in Example 1 except that the following ferromagnetic metal powders were used.

Ferromagnetic metal powder 100 parts
  Fe/Co, atomic ratio: 100/30,
  Al/Fe, atomic ratio: 11/100,
  Y/Fe, atomic ratio: 5/100
  Hc: 2,150 Oe
  $S_{BET}$: 48 m /g
  Crystallite size: 180 Å
  Length of long axis: 0.08 μm
  Acicular ratio: 7
  $\sigma_s$: 135 emu/g

Example 6

A DVC video tape was prepared in the same manner as in Example 1 except for replacing the polyurethane resin A in the upper and lower layers with the following polyurethane resin B.

Polyurethane resin B
  Neopentyl glycol/caprolactone polyol/MDI=0.9/2.6/1 (containing —$SO_3Na$: 1×10⁻⁴ eq/g)

Characteristics of the thus-obtained magnetic recording medium in Examples and Comparative Examples were measured according to the following methods. The results obtained are shown in Table 2.

Evaluation Methods

1/2 Tb Output

Cam Coder DJ-1 (a product of Matsushita Electric Industrial Co., Ltd.) was modified to Tb:BIT spacing and signal output at 1/2 Tb frequency (21 MHz) was measured. Recording electric current was according to deck command. Reference tape "MTR1221" for DVC use was taken as 0 dB. In general, −1.0 dB or more is practicable, preferably −0.5 dB or more.

1/90 Tb Output

Cam Coder DJ-1 (a product of Matsushita Electric Industrial Co., Ltd.) was modified to Tb:BIT spacing and signal output at 1/90 Tb frequency (464 MHz) was measured. Recording electric current was according to deck command. Reference tape "MTR1221" for DVC use was taken as 0 dB. In general, −1.0 dB or more is practicable, preferably −0.5 dB or more.

1/75 Tb Signal O/W (Overwriting Characteristics)

In the first place, signals at 1/75 Tb frequency were recorded on the above DJ-1 modified cam coder. Then, these 1/75 Tb signals were reproduced and the output was measured. Then, overwriting was performed using data signals and the erasure-remaining 1/75 Tb signals were measured with a spectrum analyzer. The difference between 1/75 Tb signal outputs before and after data signal recording was taken as O/W erasure factor. The same measurement was conducted using Reference tape "MTR1221" for DVC use, and the difference therebetween was taken as 1/75 Tb signal O/W. In general, +1.0 dB or less is practicable, preferably +0.5 dB or less.

Ra

The center line average surface roughness was measured using a digital optical profilometer (a product of WYKO) by the light interference method under the conditions of a cut-off value of a 0.25 mm.

Hc, φm, P

Magnetic characteristics were measured parallelly to the orientation direction using a sample vibration type magnetometer (a product of Toei Kogyo K.K.) under outer magnetic field of 10 KOe.

TABLE 2

|  | Ex. 1 | Ex. 2 | Ex. 3 | Comp. Ex. 1 | Comp. Ex. 2 | Ex. 4 | Ex. 5 | Ex. 6 |
|---|---|---|---|---|---|---|---|---|
| Magnetic Layer |  |  |  |  |  |  |  |  |
| Hc (Oe) | 2,250 | 2,150 | 2,200 | 2,250 | 2,250 | 2,150 | 2,150 | 2,250 |
| φm (G · cm) | 0.055 | 0.065 | 0.072 | 0.072 | 0.043 | 0.065 | 0.065 | 0.055 |
| P | 124 | 140 | 158 | 164 | 97 | 140 | 140 | 124 |
| Ra (nm) | 1.8 | 2.0 | 1.9 | 1.7 | 2.1 | 2.5 | 1.8 | 2.5 |
| Evaluation |  |  |  |  |  |  |  |  |
| 1/2 Tb output (db) | 0 | −0.2 | −0.5 | 0.2 | −0.9 | −1.0 | −0.8 | −1.0 |
| 1/90 Tb output (db) | −0.5 | 0.0 | 1.2 | 1.5 | −2.0 | 0.5 | −1.0 | 0.5 |
| 1/75 Tb signal O/W (dB) | +0.2 | +0.5 | +0.9 | +2.5 | −1.0 | +1.0 | +1.0 | +1.0 |

The following facts are seen from Table 2:

Examples 1 and 2: The output and overwriting characteristics were well balanced. These are desirable examples.

Example 3: As the P value is approaching the upper limit, the overwriting characteristics were in medium grade.

Comparative Example 1: As the P value exceeded the upper limit, the overwriting characteristics were inferior.

Comparative Example 2: As the P value was less than the lower limit, the 1/90 Tb output was inferior and the 1/2 Tb output was in medium grade.

Example 4: As the $S_{BET}$ of the magnetic powder exceeded the desired range, the surface property of the recording medium was inferior and the 1/2 Tb output and overwriting characteristics were in medium grade.

Example 5: As the $\sigma_s$ of the magnetic layer was lower than the desired range, the output and overwriting characteristics were in medium grade.

Example 6: As the binder resin was replaced with polyurethane resin B, the surface property was inferior and the 1/2 Tb output and overwriting characteristics were in medium grade.

Therefore, by regulating magnetic characteristics P within the prescribed range, a magnetic recording medium which exhibits excellent overwriting characteristics, reproduction output and running durability can be obtained.

EXAMPLES 7 TO 11

Comparative Examples 3 to 7

Example 7

| Single Magnetic Layer Coating Solution | |
| --- | --- |
| Ferromagnetic metal fine powder | 100 parts |
| Fe/Co, atomic ratio: 100/30, | |
| Al/Fe, atomic ratio: 8/100, | |
| Y/Fe, atomic ratio: 6/100 | |
| Hc: 2,250 Oe | |
| $S_{BET}$: 45 m²/g | |
| Crystallite size: 170 Å | |
| Particle size (diameter of long axis): 0.09 μm | |
| Acicular ratio: 8 | |
| $\sigma_s$: 150 emu/g | |
| Vinyl chloride copolymer MR110 | 10 parts |
| (manufactured by Nippon Zeon Co., Ltd., Japan) | |
| Polyurethane resin UR-8200 | 6 parts |
| (manufactured by Toyobo Co., Ltd., Japan) | |
| α-Al₂O₃ (average particle size: 0.15 μm) | 5 parts |
| Carbon black (average particle size: 0.08 μm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |

The above coating solution compositions were blended in an open kneader, then dispersed with a sand mill. To the resulting dispersion was added 5 parts of polyisocyanate (Coronate L, manufactured by Nippon Polyurethane Co., Ltd., Japan), further, 40 parts of a mixed solution of methyl ethyl ketone and cyclohexanone was added. The solution was filtered through a filter having an average pore diameter of 1 μm to obtain a coating solution.

| Lower Layer Coating Solution (nonmagnetic layer) | |
| --- | --- |
| Nonmagnetic powder, α-Fe₂O₃ (hematite) | 80 parts |
| Length of long axis: 0.15 μm | |
| $S_{BET}$: 52 m²/g | |
| pH: 8 | |
| Tap density: 0.8 | |
| DBP oil absorption: 27 to 38 ml/100 g | |
| Surface-covering compound: Al₂O₃, SiO₂ | |
| Carbon black | 20 parts |
| Average primary particle size: 16 mμ | |
| DBP oil absorption: 120 ml/100 g | |
| pH: 8.0 | |
| $S_{BET}$: 250 m²/g | |
| Volatile content: 1.5% | |

| -continued | |
| --- | --- |
| Lower Layer Coating Solution (nonmagnetic layer) | |
| Vinyl chloride copolymer | 12 parts |
| MR104, (manufactured by Nippon Zeon Co., Ltd., Japan) | |
| Polyesterpolyurethane resin having a cyclic structure and a polyether group | 5 parts |
| α-Al₂O₃ (average particle size: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

The above compositions for the lower layer coating solution were blended in an open kneader, then dispersed with a sand mill. Five parts of polyisocyanate (Coronate L, manufactured by Nippon Polyurethane Co., Ltd., Japan) was added to the resulting dispersion solution of the lower layer, then, 40 parts of a mixed solution of methyl ethyl ketone and cyclohexanone was added to the dispersion solution. The solution was filtered through a filter having an average pore diameter of 1 μm to obtain coating solution for the lower coating layer.

These coating solutions were simultaneously multilayer-coated on a polyethylene naphthalate support having a thickness of 5.2 μm and a center line average surface roughness of 0.001 μm of the side on which a magnetic layer was to be coated. The lower layer coating solution was coated in a dry thickness of 1.5 μm, immediately thereafter the upper magnetic layer coating solution was coated on the lower layer so as to give the magnetic layer having a thickness of 0.15 μm. Magnetic powders were oriented with a cobalt magnet having a magnetic force of 5,000 G and a solenoid having a magnetic force of 4,000 G while both layers were still wet. After drying, the coated layer was subjected to calendering treatment with calenders of 7 stages comprising metal rolls and epoxy resin rolls at 100° C. at a rate of 200 m/min. Then, a backing layer having a thickness of 0.5 μm was coated. The obtained web was slit to a width of 6.35 mm to prepare a DVC video tape.

EXAMPLES 8 TO 11

Comparative Examples 3 to 7

Video tapes were prepared in the same manner as in Example 7 except that the conditions were changed as shown in Table 3.

Each video tape in Examples 7 to 11 and Comparative Examples 3 to 7 was measured for the following items of characteristics. The measuring methods are as follows.

Evaluation Methods

1/2 Tb Output

Evaluated in the same manner as in Example 1.

1/2 Tb CNR

1/2 Tb signal frequency was recorded by the prescribed recording electric current. Then, total noise and amplifier noise of 2/1 Tb signal output, 1/2.25 Tb frequency and 1/1.8 Tb frequency were measured. Measurements were all conducted by resolution width of 30 KHz. Definition of tape noises are as follows.

$$N_{tape} = (N_{tot}^2 - N_{amp}^2)^{1/2}$$

$$N_{tot} = (N_{tot}1 + N_{tot}2)/2$$

$N_{tot}1$: total noise by 1/2.25 Tb frequency
$N_{tot}2$: total noise by 1/1.8 Tb frequency
$N_{amp}$: amplifier noise by 1/2 Tb frequency The ratio of 1/2 Tb output to $N_{tape}$ is taken as C/N ratio (CNR) and Reference tape "MTR1221" for DVC use as 0 dB.

The values of −2 dB or more are acceptable.

1/75 Tb O/W (Overwriting Characteristics)

Evaluated in the same manner as in Example 1.

1/4 Tb O/W

In the first place, signals at 1/4 Tb frequency were recorded on the above DJ-1 modified cam coder. Then, these 1/4 Tb signals were reproduced and the output was measured. Then, overwriting was performed using data signals and the erasure-remaining 1/4 Tb signal was measured with a spectrum analyzer. The difference between 1/4 Tb signal outputs before and after data signal recording was taken as O/W erasure factor. The same measurement was conducted using Reference tape "MTR1221" for DVC use, and the difference therebetween was taken as 1/4 Tb O/W.

The values of +2 dB or more are acceptable.

Hc, φm, P

Evaluations were conducted in the same manner as in Example 1.

The results of evaluations of the above items of characteristics of each video tape in Examples 7 to 11 and Comparative Examples 3 to 7 are shown in Table 3 below.

It is clearly seen from the results in Table 3 that samples in which the P is within the range of from 100 to 160, the ferromagnetic metal powders comprises Fe as a main component having the long axis length of from 0.05 to 0.13 μm and crystallite size of from 80 to 200 Å, the thickness of the magnetic layer is from 0.05 to 0.5 μm, and SFD in the in-plane machine direction is 0.41 or less, exhibit excellent overwriting characteristics and reproduction output and low noise.

EXAMPLES 12–19

Reference Examples 1–7 and Comparative Examples 8 and 9

Lower Layer Coating Solution (nonmagnetic):
(Coating composition A)

Nonmagnetic powder, α-Fe₂O₃ (hematite)       80 parts
Length of long axis: 0.15 μm
$S_{BET}$: 52 m²/g
pH: 9
Tap density: 0.8
Surface-covering compound: $Al_2O_3$, $SiO_2$

TABLE 3

|  | Example 7 | Example 8 | Example 9 | Comparative Example 3 | Comparative Example 4 |
|---|---|---|---|---|---|
| Length of long axis of magnetic powder (μm) | 0.09 | 0.06 | 0.13 | 0.04 | 0.15 |
| Crystallite size (Å) | 170 | 130 | 195 | 150 | 170 |
| Thickness of magnetic layer | 0.2 | 0.2 | 0.2 | 0.2 | 0.2 |
| SFD | 0.35 | 0.32 | 0.40 | 0.46 | 0.35 |
| Hc (Oe) | 2380 | 2300 | 2450 | 1850 | 1820 |
| φm (G · cm) | 0.055 | 0.057 | 0.051 | 0.053 | 0.052 |
| P | 131 | 131.1 | 125 | 98 | 94 |
| Coating method | simultaneous multilayer coating | simultaneous multilayer coating | simultaneous multilayer coating | simultaneous multilayer coating | simultaneous multilayer coating |
| 1/2 Tb output | 0 | −0.2 | −0.8 | −1.2 | −1.5 |
| 1/2 Tb CNR | −1.0 | 0.0 | −1.5 | −0.5 | −3.5 |
| 1/4 Tb signal O/W | +0.2 | −0.5 | 0.2 | +2.5 | +2.0 |
| 1/75 Tb signal O/W | +0.8 | +0.2 | +0.5 | +5.5 | +1.8 |
|  | Comparative Example 5 | Comparative Example 6 | Example 10 | Comparative Example 7 | Example 11 |
| Length of long axis of magnetic powder (μm) | 0.09 | 0.09 | 0.09 | 0.09 | 0.09 |
| Crystallite size (Å) | 220 | 170 | 170 | 170 | 170 |
| Thickness of magnetic layer | 0.2 | 0.7 | 0.5 | 0.04 | 0.2 |
| SFD | 0.51 | 0.32 | 0.34 | 0.30 | 0.32 |
| Hc (Oe) | 2050 | 2380 | 2050 | 2450 | 2380 |
| φm (G · cm) | 0.08 | 0.15 | 0.078 | 0.03 | 0.06 |
| P | 164 | 357 | 160 | 73.5 | 143 |
| Coating method | simultaneous multilayer coating | simultaneous multilayer coating | simultaneous multilayer coating | simultaneous multilayer coating | simultaneous multilayer coating |
| 1/2 Tb output | −0.8 | −0.2 | −0.2 | −3.0 | −0.0 |
| 1/2 Tb CNR | −3.2 | −0.5 | −0.2 | −5.0 | −1.0 |
| 1/4 Tb signal O/W | +4.5 | 5.2 | +2.0 | −1.2 | +0.2 |
| 1/75 Tb signal O/W | +6.2 | +6.5 | +1.0 | −1.1 | +0.9 |

-continued

| | |
|---|---|
| Carbon black | 20 parts |
| Average primary particle size: 16 mµ | |
| DBP oil absorption: 80 ml/100 g | |
| pH: 8.0 | |
| $S_{BET}$: 250 m$^2$/g | |
| Volatile content: 1.5% | |
| Vinyl chloride copolymer | 12 parts |
| MR104, (manufactured by Nippon Zeon | |
| Co., Ltd., Japan) | |
| Polyurethane (shown in Table 5) | |
| α-AL$_2$O$_3$ (average particle size: 0.2 µm) | 1 part |
| Butyl stearate | 1 part |
| Stearic acid | 1 part |
| Methyl ethyl ketone | 100 parts |
| Cyclohexanone | 50 parts |
| Toluene | 50 parts |
| Lower Layer Coating Solution (nonmagnetic): (Coating composition B) | |
| Nonmagnetic powder, TiO$_2$ (titanium oxide) | 80 parts |
| Average primary particle size: 0.02 µm | |
| $S_{BET}$: 70 m$^2$/g | |
| pH: 7 | |
| Tap density: 0.8 | |
| Surface-covering compound: Al$_2$O$_3$, SiO$_2$ | |
| Carbon black | 20 parts |
| Average primary particle size: 16 mµ | |
| DBP oil absorption: 80 ml/100 g | |
| pH: 8.0 | |
| $S_{BET}$: 250 m$^2$/g | |
| Volatile content: 1.5% | |
| Vinyl chloride copolymer | 12 parts |
| MR104, (manufactured by Nippon Zeon | |
| Co., Ltd., Japan) | |
| Polyurethane (shown in Table 5) | |
| α-Al$_2$O$_3$ (average particle size: 0.2 µm) | 1 part |
| Butyl stearate | 1 part |
| Stearic acid | 1 part |
| Methyl ethyl ketone | 100 parts |
| Cyclohexanone | 50 parts |
| Toluene | 50 parts |
| Magnetic Coating Solution (magnetic layer): | |
| Ferromagnetic metal fine powder | 100 parts |
| A to E shown in Table 4 | |
| Vinyl chloride copolymer | Table 6 |
| (MR110 manufactured by Nippon Zeon Co., Ltd., Japan) | |
| Polyesterpolyurethane resin | Table 6 |
| α-Al$_2$O$_3$ (average particle size: 0.15 µm) | 5 parts |
| Carbon black (average particle size: 0.08 µm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |

TABLE 4

| Magnetic Composition | A | B | C | D | E |
|---|---|---|---|---|---|
| Co/Fe atomic % | 20.0 | 28.5 | 30.2 | 29.5 | 30.1 |
| Ni/Fe atomic % | 0.1> | 0.1> | 0.1> | 0.1> | 0.1> |
| Al/Fe atomic % | 10.0 | 7.0 | 11.2 | 7.0 | 7.2 |
| Y/Fe atomic % | 4.8 | 6.2 | 6.5 | 8.1 | 8.31 |
| Si/Fe atomic % | 1.5 | 0.1> | 0.1> | 0.13 | 0.13 |
| Hc (Oe) | 1,900 | 2,100 | 2,230 | 2,390 | 2,480 |
| σ$_s$ (emu/g) | 133 | 157 | 137 | 148 | 148 |
| $S_{BET}$ (m$^2$/g) | 48 | 41 | 56 | 48 | 49 |

TABLE 4-continued

| Magnetic Composition | A | B | C | D | E |
|---|---|---|---|---|---|
| Crystallite size (Å) | 163 | 160 | 182 | 145 | 145 |
| Length of long axis (µm) | 0.10 | 0.08 | 0.08 | 0.08 | 0.08 |
| Axis ratio (acicular ratio) | 5 | 4 | 4 | 5 | 5 |

TABLE 5

| | | |
|---|---|---|
| A | Molecular weight: 36,000, Tg: 94° C. | |
| | Hydrogenated bisphenol A | 0.6 mol |
| | Sodium salt of bis(2-hydroxethyl)5-sulfoisophthalate | 0.3 mol |
| | Sulfoisophthalic acid-ethylene oxide adduct | 0.05 mol |
| | Diphenylmethane-diisocyanate | 1.0 mol |
| | Trimethylolpropane | 0.05 mol |
| | —SO$_3$Na group (6.0 × 10$^{-5}$ eq/g) | |
| B | Molecular weight: 40,000, Tg: 64° C. | |
| | Neopentyl glycol | 3.2 mol |
| | Cyclohexanedimethanol | 0.7 mol |
| | Hydroxy pivalic acid | 0.8 mol |
| | Phthalic acid | 4.4 mol |
| | Diphenymethanediisocyanate | 1.0 mol |
| | —SO$_3$Na group (6.0 × 10$^{-5}$ eq/g) | |

The above compositions of the coating solutions for the lower coating layer and the upper magnetic layer were respectively blended in an open kneader, then dispersed with a sand mill. To each resulting dispersion was added 5 parts of polyisocyanate (Coronate L, manufactured by Nippon Polyurethane Co., Ltd., Japan), further, 40 parts of a mixed solution of methyl ethyl ketone and cyclohexanone was added. Each solution was filtered through a filter having an average pore diameter of 1 µm to obtain coating solutions for the lower coating layer and the upper magnetic layer.

In Reference Examples 1 to 4, the same vinyl chloride resins, urethane resins and curing agents were added to the upper magnetic layer and the lower coating layer. In Examples 12 to 18, Reference Examples 5 and 6 and Comparative Examples 8 and 9, a urethane resin and a curing agent were added to the upper magnetic layer and a vinyl chloride resin, a urethane resin and a curing agent were added to the lower nonmagnetic layer. These coating solutions were simultaneously multilayer coated on a polyethylene naphthalate support having a thickness of 5.0 µm and a center line average surface roughness of 0.002 µm of the side on which a magnetic layers were to be coated. The lower layer coating solution was coated in a dry thickness of 1.2 µm, immediately thereafter the upper magnetic layer coating solutions were coated on the lower layer so as to give the magnetic layer having a thicknesses of 0.03, 0.12 and 0.3 µm, respectively. Magnetic powders were oriented with a cobalt magnet having a magnetic force of 6,000 G and a solenoid having a magnetic force of 5,000 G while both layers were still wet. After drying, the coated layer was subjected to calendering treatment with calenders of 7 stages comprising metal rolls at 90° C. at a rate of 200 m/min. Then, a backing layer having a thickness of 0.5 µm was coated. The obtained web was slit to a width of 8 mm. The magnetic layer surface of the thus-produced web was cleaned with a tape cleaning apparatus of a nonwoven fabric and a sapphire blade of an acute angle pressed against the surface of the tape, which was attached to a machine having delivery and winding-up motion of a slit product. Thus, an 8 mm DVC video tape was produced.

An abrasive tape was attached to the above cleaning apparatus so as to touch the magnetic layer surface and the same tape was cleaned 10 more times to remove the binder on the surface of the tape. In Reference Example 7, the tape in Reference Example 3, and in Example 19, the tape in Reference Example 4 were respectively used.

The results obtained are shown in Table 6. Evaluation methods are as follows.

Evaluation Methods
Thickness of Magnetic Layer

The sample having a thickness of about 0.1 $\mu$m was cut out with a diamond cutter in the machine direction of the magnetic medium, observed with a transmission type electron microscope of 30,000 magnifications and photographed. The print size of the photograph was A4 size (i.e., 21.0 cm×29.7 cm). The present inventors paid attentions to the difference of the shapes of the ferromagnetic powders and the nonmagnetic powders of the magnetic layer and the nonmagnetic layer and rimmed the interface and the surface of the magnetic layer with black by visual judgement. Thereafter, the distance of the rimmed lines was measured by the image processing apparatus "IBAS2" (manufactured by Zeiss). Measurement was conducted over the length of 21 cm of the sample photograph at optional measuring points. The average value of the simple addition of the measured values was taken as the thickness of the magnetic layer.

Surface Roughness Ra of Magnetic Layer

Ra of the area of about 250 nm×250 nm was measured with a light interference three dimensional roughness meter "TOPO3D" (a product of WYKO, Arizona, U.S.A.) by MIRAU method. The wavelength of measurement was 650 nm and spherical compensation and cylindrical compensation were applied.

Electromagnetic Characteristics
Output of Recording Wavelength of 0.488 $\mu$m

Output was measured at relative speed of 10.2 m/sec using the reference ME tape of Fuji Photo Film Co., Ltd. and an outer drum tester. Fe head was used, Bs was 1.5 T. The value was recorded and reproduced by an optimal recording electric current as defined below.

The output of recording wavelength of 0.488 $\mu$m is preferably within the range of −2 dB to +2 dB.

Overwriting Erasure Factor

Rectangular wave signals of recording wavelength of 22 $\mu$m were recorded using an outer drum tester, the output was reproduced and measured. The rectangular wave signals of recording wavelength of 0.488 $\mu$m were recorded thereon and reproduced, and the output of recording wavelength of 22 $\mu$m was read with a spectrum analyzer. The ratio of the output of wavelength 22 $\mu$m before and after overwriting recording was taken as overwriting erasure factor. −20 dB or less is preferred as the absolute value.

Corrosion of Head

The magnetic layer was touched with a test piece formed by sputtering permalloy film on a PET base and stored in the atmosphere of 60° C., 90% RH for one week and the corrosion of the sputtered permalloy film was evaluated. Evaluation was conducted by visual observation using a 50 magnification microscope in three grades of G: no corrosion, M: generation of one corrosion, and B: 2 or more corrosions.

Running Durability

Under the conditions of 23° C., 70% RH, using ten 8 mm video decks FUJIX8 (a product of Fuji Photo Film Co., Ltd.), a tape was run 100 times respectively. The reduction of output and the staining inside of the deck after running were evaluated.

G: The reduction of output was less than 3 dB and staining of each part in the deck was not observed visually.

M: The reduction of output was less than 3 dB but considerable staining of each part in the deck was observed visually.

B: The reduction of output was 3 dB or more.

Chlorine Amount on the Surface/iron Amount on the Surface
Evaluated using ESCA (PHI560 type produced by Co.), by the following conditions.

Measuring Conditions
Mg ANODE: 300 W, pass energy: 100 eV
Cl1s, N1s, Fe2p3/2 peak was narrow-scanned.
Area intensity ratio of each peak was expressed by Cl/Fe, N/Fe.
Measuring time: about 10 minutes

TABLE 6

|  | Ref. Ex. 1 | Ref. Ex. 2 | Ex. 12 | Ex. 13 | Ref. Ex. 3 |
|---|---|---|---|---|---|
| Magnetic powder | B | B | B | B | B |
| Content of vinyl chloride in the magnetic layer (parts by weight) | 17 | 12 | 0 | 0 | 17 |
| Kind of urethane in the magnetic layer | A | A | A | A | A |
| Content of urethane in the magnetic layer (parts by weight) | 7 | 7 | 19 | 12 | 7 |
| Lower layer composition | B | B | B | B | A |
| Thickness of the magnetic layer ($\mu$m) | 0.13 | 0.15 | 0.12 | 0.12 | 0.14 |
| Coercivity of the magnetic layer (Oe) | 2110 | 2095 | 2100 | 2120 | 2120 |
| Saturation magnetization per unit area ($\phi$m) (G · cm) | 0.055 | 0.062 | 0.054 | 0.058 | 0.053 |
| P | 116 | 129.9 | 113 | 123 | 112.3 |
| Output of recording wavelength 0.5 $\mu$m (dB) | −1.8 | −1.5 | −1.2 | −0.7 | −1.3 |
| o/w erasure factor (dB) | −25.5 | −24.2 | −26.0 | −26.4 | −24.3 |
| Cl/Fe ratio | 0.82 | 0.34 | 0.14 | 0.16 | 0.78 |
| Head staining | B | M | G | G | B |

TABLE 6-continued

| | | | | | |
|---|---|---|---|---|---|
| Head corrosion | B | M | G | G | B |

| | Ref. Ex. 4 | Ex. 14 | Ex. 15 | Ex. 16 | Ref. Ex. 5 |
|---|---|---|---|---|---|
| Magnetic powder | B | B | B | B | B |
| Content of vinyl chloride in the magnetic layer (parts by weight) | 12 | 0 | 0 | 0 | 0 |
| Kind of urethane in the magnetic layer | A | A | A | B | A |
| Content of urethane in the magnetic layer (parts by weight) | 7 | 19 | 12 | 12 | 12 |
| Lower layer composition | A | A | A | A | A |
| Thickness of the magnetic layer ($\mu$m) | 0.14 | 0.13 | 0.14 | 0.13 | 0.03 |
| Coercivity of the magnetic layer (Oe) | 2100 | 2110 | 2110 | 2120 | 2080 |
| Saturation magnetization per unit area ($\phi$m) (G · cm) | 0.055 | 0.057 | 0.061 | 0.054 | 0.053 |
| P | 116 | 120 | 128.7 | 114.5 | 110 |
| Output of recording wavelength 0.5 $\mu$m (dB) | −1.1 | −0.8 | −0.4 | −0.9 | −2.7 |
| O/W erasure factor (dB) | −23.3 | −26.2 | −25.8 | −25.2 | −29.3 |
| Cl/Fe ratio | 0.65 | 0.21 | 0.13 | 0.21 | 0.15 |
| Head staining | M | G | G | G | G |
| Head corrosion | M | G | G | G | G |

| | Comp. Ex. 8 | Comp. Ex. 9 | Ex. 17 | Ex. 18 | Ref. Ex. 6 |
|---|---|---|---|---|---|
| Magnetic powder | B | A | C | D | E |
| Content of vinyl chloride in the magnetic layer (parts by weight) | 0 | 0 | 0 | 0 | 0 |
| Kind of urethane in the magnetic layer | A | A | A | A | A |
| Content of urethane in the magnetic layer (parts by weight) | 12 | 12 | 12 | 12 | 12 |
| Lower layer composition | A | A | A | A | A |
| Thickness of the magnetic layer ($\mu$m) | 0.32 | 0.11 | 0.13 | 0.13 | 0.14 |
| Coercivity of the magnetic layer (Oe) | 2130 | 1920 | 2280 | 2400 | 2480 |
| Saturation magnetization per unit area ($\phi$m) (G · cm) | 0.13 | 0.048 | 0.058 | 0.058 | 0.052 |
| P | 277 | 92 | 132 | 139 | 129 |
| Output of recording wavelength 0.5 $\mu$m (dB) | −0.4 | −2.2 | +0.2 | +0.4 | 0.5 |
| O/W erasure factor (dB) | −19.5 | −28.6 | −24.3 | −22.0 | −19.8 |
| Cl/Fe ratio | 0.18 | 0.17 | 0.17 | 0.23 | 0.19 |
| Head staining | G | G | G | G | G |
| Head corrosion | G | G | G | G | G |

| | Ref. Ex. 7 | Ex. 19 |
|---|---|---|
| Magnetic powder | B | B |
| Content of vinyl chloride in the magnetic layer (parts by weight) | 17 | 12 |
| Kind of urethane in the magnetic layer | A | A |
| Content of urethane in the magnetic layer (parts by weight) | 7 | 7 |
| Lower layer composition | A | A |
| Thickness of the magnetic layer ($\mu$m) | 0.14 | 0.14 |
| Coercivity of the magnetic layer (Oe) | 2120 | 2100 |
| Saturation magnetization per unit area ($\phi$m) (G · cm) | 0.053 | 0.055 |
| P | 112 | 116 |
| Output of recording wavelength 0.5 $\mu$m (dB) | −1.3 | −1.1 |
| O/W erasure factor (dB) | −24.3 | −23.3 |
| Cl/Fe ratio | 0.56 | 0.28 |
| Head staining | M | G |
| Head corrosion | M | G |

A magnetic recording medium capable of providing high density recording and having excellent overwriting characteristics, running durability and corrosion resistance can be obtained by constituting an extremely thin magnetic layer containing ferromagnetic fine powders and reducing the chlorine amount on the surface.

While the invention has been described in detail and with reference to specific examples thereof, it will be apparent to one skilled in the art that various changes and modifications can be made therein without departing from the spirit and scope thereof.

What is claimed is:

1. A magnetic recording tape which comprises a support having thereon a magnetic layer comprising a ferromagnetic metal powder and a binder, wherein said magnetic layer has the product P of the following formula:

$$P = Hc \times fm$$

(wherein Hc represents a coercivity in the in-plane machine direction of said tape expressed with a unit Oersted and fm represents magnetic flux per unit area in the in-plane machine direction of said magnetic layer expressed with a unit Gauss·cm) in a range from 100 to 160 (Oe·G·cm) and the ratio of chlorine amount to Fe amount on an upper surface of said magnetic layer is from 0.13 to 0.2 in terms of a Cl/Fe intensity ratio obtained by ESCA, said upper surface containing chlorine.

2. The magnetic recording tape as claimed in claim 1, wherein the ferromagnetic metal powder has a specific surface area $S_{BET}$ measured by the BET method of 30 m$^2$/g to less than 50 m$^2$/g and saturation magnetization $\sigma_s$ of 140 to 170 emu/g.

3. The magnetic recording tape as claimed in claim 1, wherein the ferromagnetic metal powder has a specific surface area $S_{BET}$ measured by the BET method of 40 m$^2$/g to less than 50 m$^2$/g and saturation magnetization $\sigma_s$ of 150 to 170 emu/g.

4. The magnetic recording tape as claimed in claim 1, wherein the coercivity Hc of said ferromagnetic metal powder is from 1,950 to 2,750 Oe.

5. The magnetic recording tape as claimed in claim 1, wherein said ferromagnetic metal powder comprises more than 50% by weight of Fe and containing 10 to 40 atomic % of Co, 2 to 20 atomic % of Al, and 1 to 15 atomic % of Y, each based on Fe.

6. The magnetic recording tape as claimed in claim 1, wherein said magnetic layer has a thickness of from 0.05 to 0.3 μm, a coercivity Hc of 2,000 to 2,400 Oe, saturation magnetization per unit area φm of 0.03 to 0.13 G·cm.

7. The magnetic recording tape as claimed in claim 1, wherein said binder contains a polyurethane resin containing a cyclic hydrocarbon group and an ether bond.

8. The magnetic recording tape as claimed in claim 1, wherein said magnetic layer contains 15 to 40 parts by weight of binder based on 100 parts of the ferromagnetic metal powder.

9. The magnetic recording tape as claimed in claim 1, wherein said magnetic layer further contains at least one abrasive selected from the group consisting of α-alumina, chromium oxide, α-iron oxide and an artificially synthesized diamond.

10. The magnetic recording tape as claimed in claim 1, wherein a back coating layer comprising a binder having dispersed therein inorganic particles is provided on the surface of the support opposite to the magnetic layer-coated side.

11. The magnetic recording tape as claimed in claim 1, wherein the product P is 110 to 150.

12. The magnetic recording tape as claimed in claim 1, wherein the product P is 120 to 140.

13. The magnetic recording tape as claimed in claim 1, wherein said saturation magnetization per unit area φm is 0.04 to 0.10 G·cm.

14. The magnetic recording tape as claimed in claim 1, wherein the surface roughness Ra of said magnetic layer is equal to or less than 3 nm.

15. The magnetic recording tape as claimed in claim 1, wherein the squareness ratio of said magnetic recording tape in the machine direction of the tape is 0.85 or more.

16. The magnetic recording tape as claimed in claim 15, wherein the binder resin comprises a polyurethane resin and an isocyanate compound, and the total amount of the polyurethane resin and the isocyanate compound is 50% by weight or more based on the total amount of the binder resin.

17. The magnetic recording tape as claimed in claim 1, wherein said ferromagnetic metal powder has a long axis length of 0.05 to 0.13 μm and crystallite size of 80 to 200 Å, and the thickness of the magnetic layer is 0.05 to 0.5 μm and SFD in the machine direction of 0.41 or less.

18. The magnetic recording tape as claimed in claim 17, wherein said SFD is from 0.15 to 0.30.

19. The magnetic recording tape as claimed in claim 1, wherein said magnetic layer further contains carbon black.

20. The magnetic recording tape as claimed in claim 19, wherein said carbon black is contained in an amount of 0.1 to 30% by weight based on the weight of the ferromagnetic metal powder.

21. The magnetic recording tape as claimed in claim 1, wherein a nonmagnetic layer containing one or more inorganic powders is provided between said support and said magnetic layer.

22. The magnetic recording tape as claimed in claim 21, wherein said one or more inorganic powders is titanium dioxide or α-iron oxide.

23. The magnetic recording tape as claimed in claim 22, wherein said nonmagnetic layer further contains carbon black.

24. The magnetic recording tape as claimed in claim 22, further comprising a polyurethane resin, wherein said polyurethane resin is a reaction product of diols and an organic diisocyanate, said diols contain a first diol containing a cyclic hydrocarbon group and having a molecular weight of 50 to less than 500 in an amount of 17 to 40% by weight based on said polyurethane resin, and a second diol having an average molecular weight of 500 to 5,000 in an amount of 10 to 50% by weight based on said polyurethane resin, and the ether bond in the second diol is contained in the amount of 1.0 to 5.0 mmol/g as an ether group based on the weight of said polyurethane resin ferromagnetic metal powder.

25. The magnetic recording tape as claimed in claim 24, wherein said polyurethane resin has a number average molecular weight of 18,000 to 56,000 and a weight average molecular weight of 30,000 to 100,000.

26. The magnetic recording tape as claimed in claim 24, wherein said polyurethane resin has Tg of 30 to 150° C.

27. The magnetic recording tape as claimed in claim 24, wherein the molecular structure of said polyurethane resin comprises at least one polar group selected from the group consisting of —SO$_3$M and —OSO$_3$M (wherein M represents a hydrogen atom, an alkali metal ion, an alkaline earth metal ion, or an ammonium ion) in an amount of 1×10$^{-5}$ to 2×10$^{-4}$ eq/g.

28. The magnetic recording tape as claimed in claim 24, wherein the molecular structure of said polyurethane resin comprises from 3 to 20 OH groups (in average).

29. The magnetic recording tape as claimed in claim 24, wherein said binder is cured by the reaction with an isocyanate curing agent.

30. The magnetic recording tape as claimed in claim 24, wherein said binder further contains a vinyl chloride polymer containing vinyl chloride as a recurring unit.

* * * * *